United States Patent
Choi

(10) Patent No.: US 8,369,023 B2
(45) Date of Patent: Feb. 5, 2013

(54) LENS SYSTEM AND IMAGE CAPTURING DEVICE HAVING THE SAME

(75) Inventor: Eun-ho Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 12/940,285

(22) Filed: Nov. 5, 2010

(65) Prior Publication Data

US 2011/0122505 A1    May 26, 2011

(30) Foreign Application Priority Data

Nov. 20, 2009  (KR) .................. 10-2009-0112794

(51) Int. Cl.
  *G02B 15/14* (2006.01)
  *G02B 15/02* (2006.01)
(52) U.S. Cl. ....................... 359/687; 359/674
(58) Field of Classification Search .............. 359/674, 359/687
  See application file for complete search history.

(56) References Cited

U.S. PATENT DOCUMENTS 7,599,722 B2 * 10/2009 Makishima ............... 455/575.3

FOREIGN PATENT DOCUMENTS

| JP | 2007-017532 A | 1/2007 |
| JP | 2008-112013 A | 5/2008 |
| JP | 2008-209741 A | 9/2008 |

* cited by examiner

*Primary Examiner* — William Choi
(74) *Attorney, Agent, or Firm* — Drinker Biddle & Reath LLP

(57) ABSTRACT

A lens system and an image capturing device having the same include a first lens group having a positive refractive power, a second lens group having a negative refractive power, a third lens group having a positive refractive power, a fourth lens group having a positive refractive power, and a fifth lens group being exchangeable with the third lens group.

23 Claims, 22 Drawing Sheets

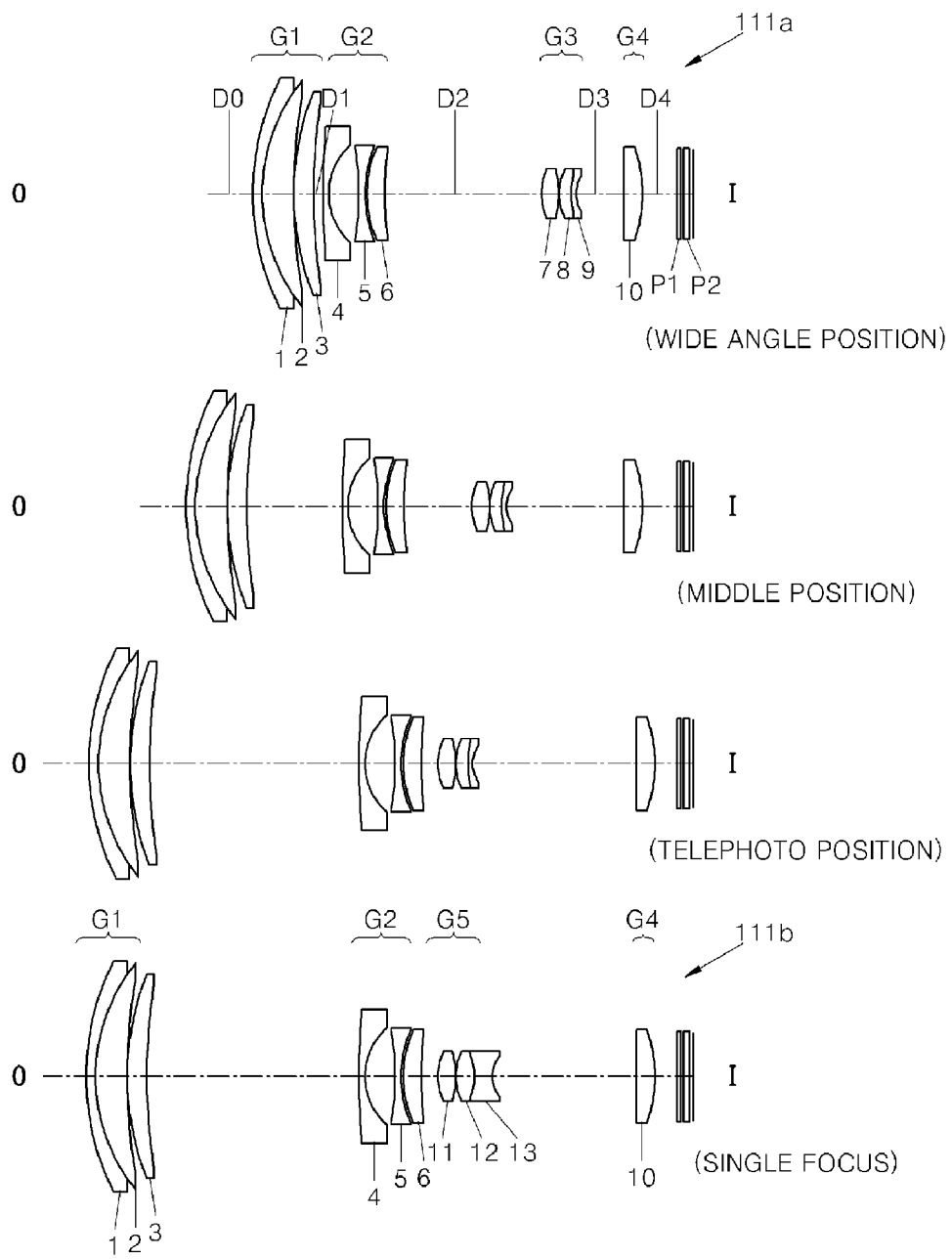

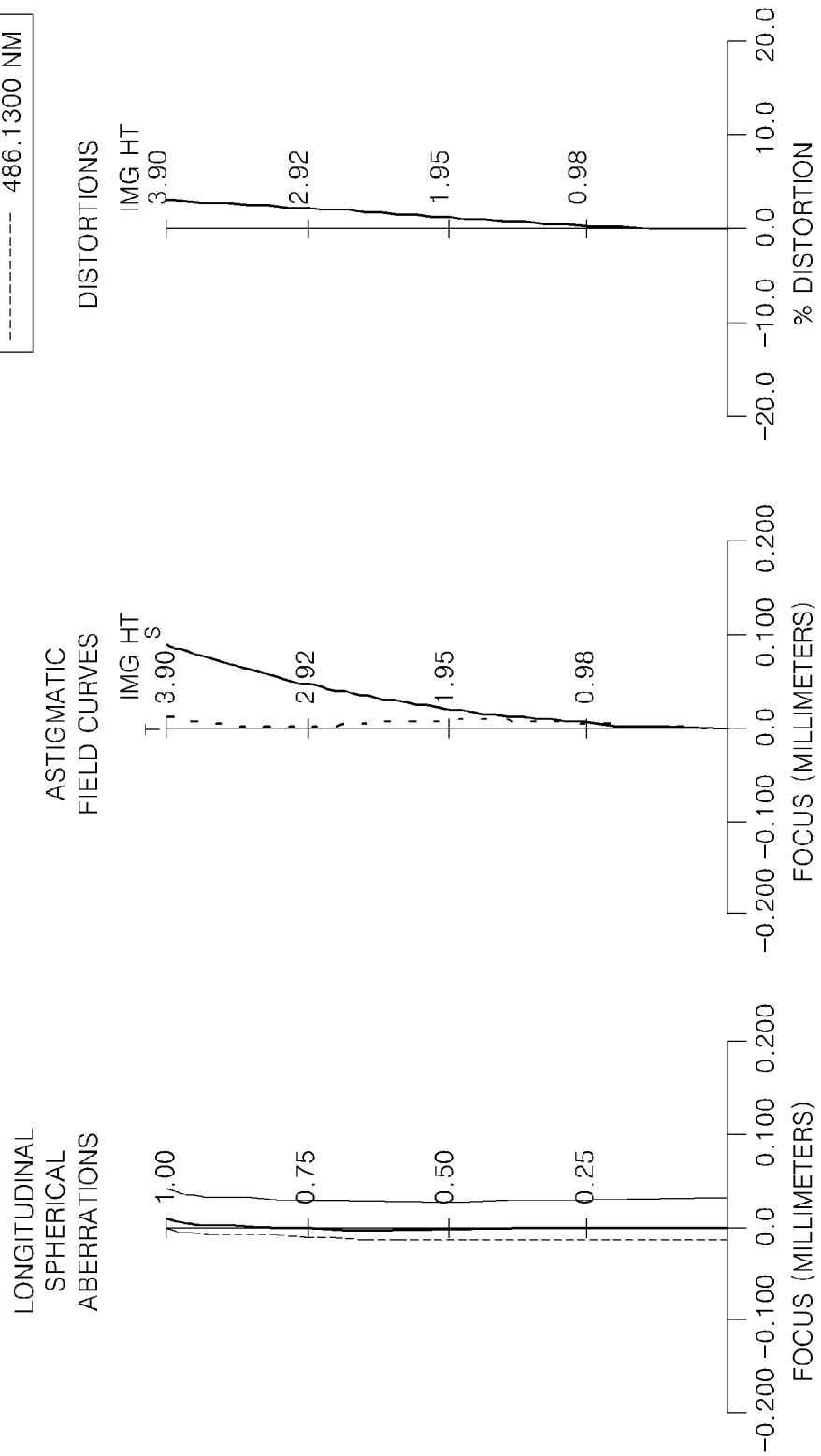

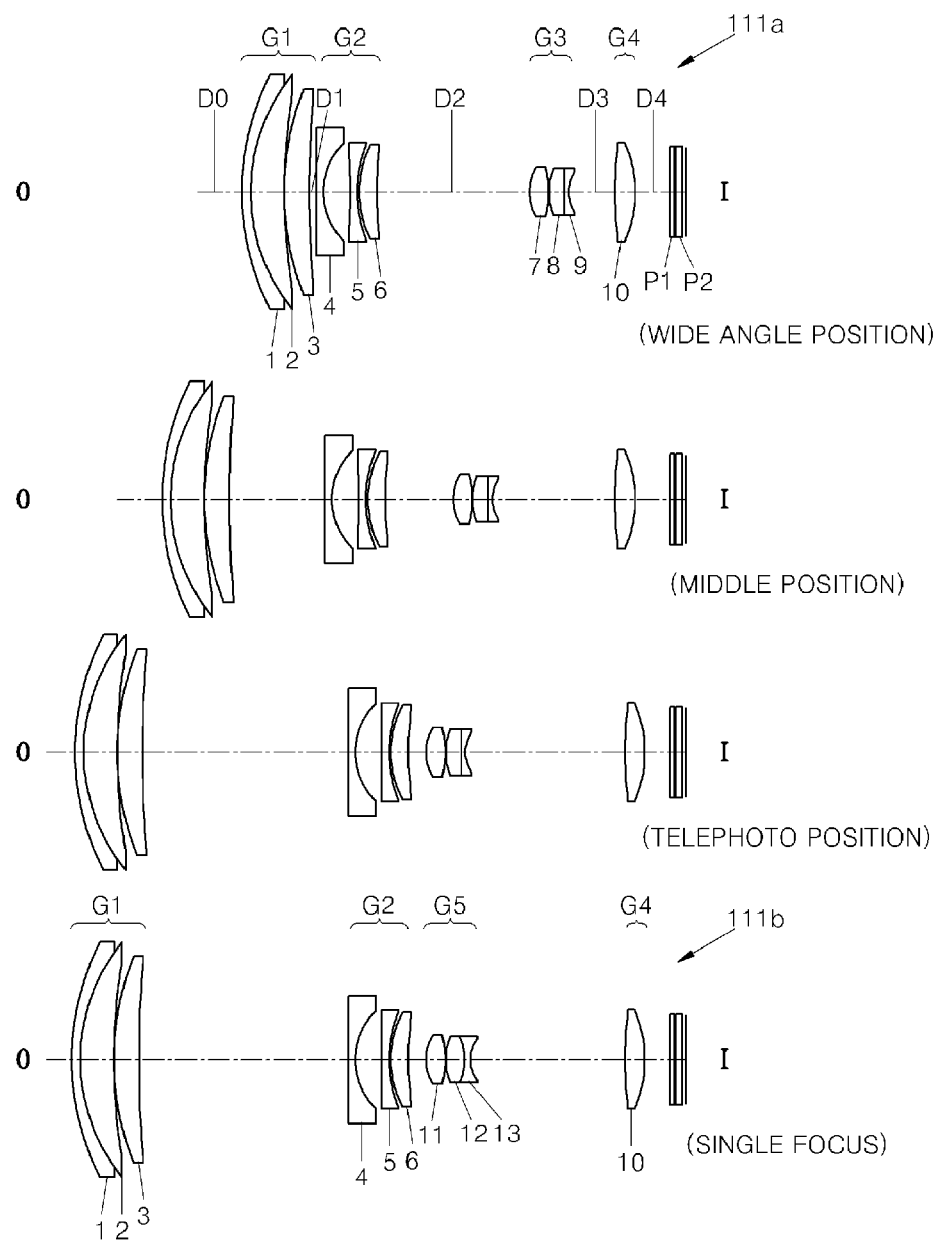

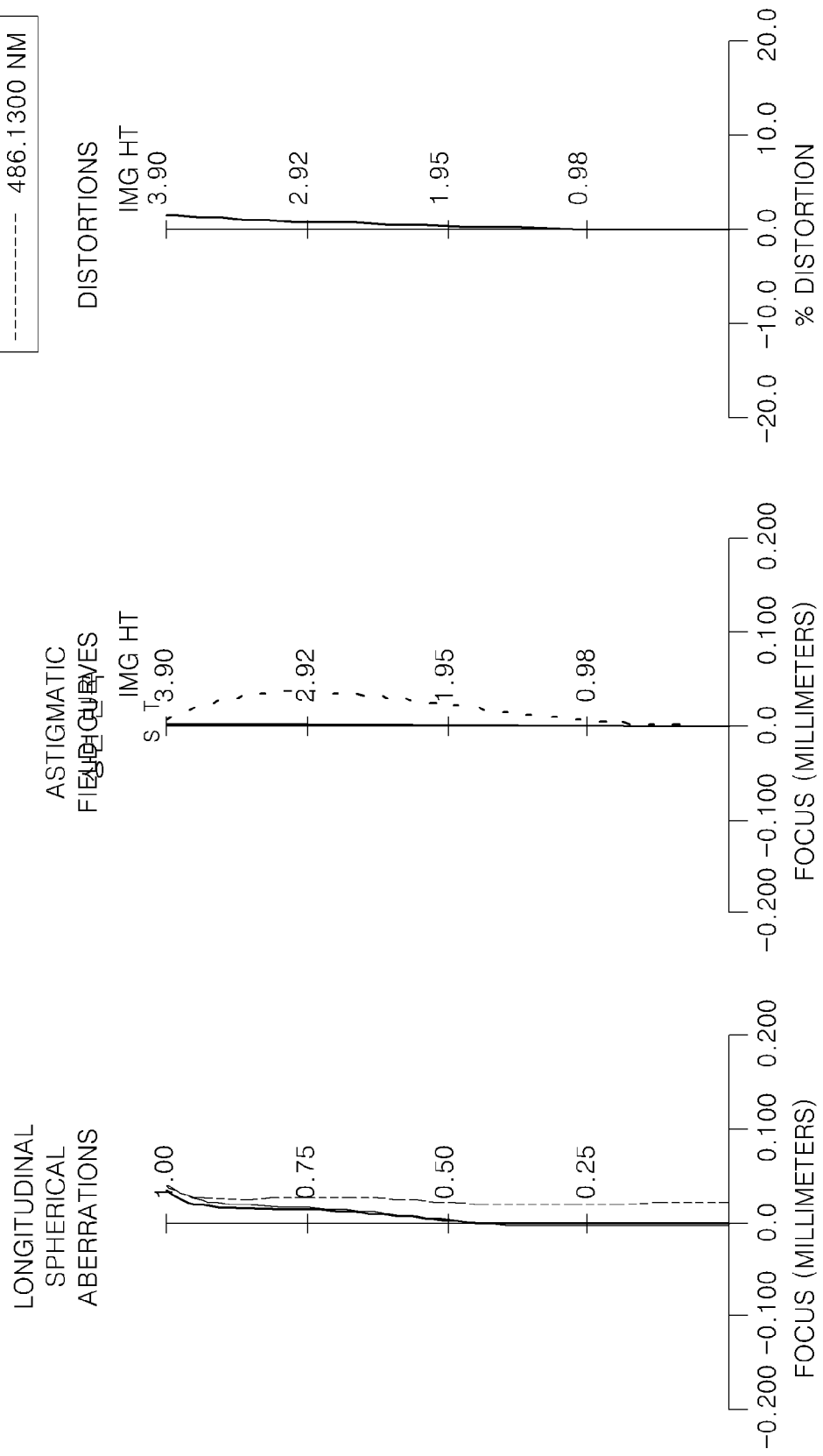

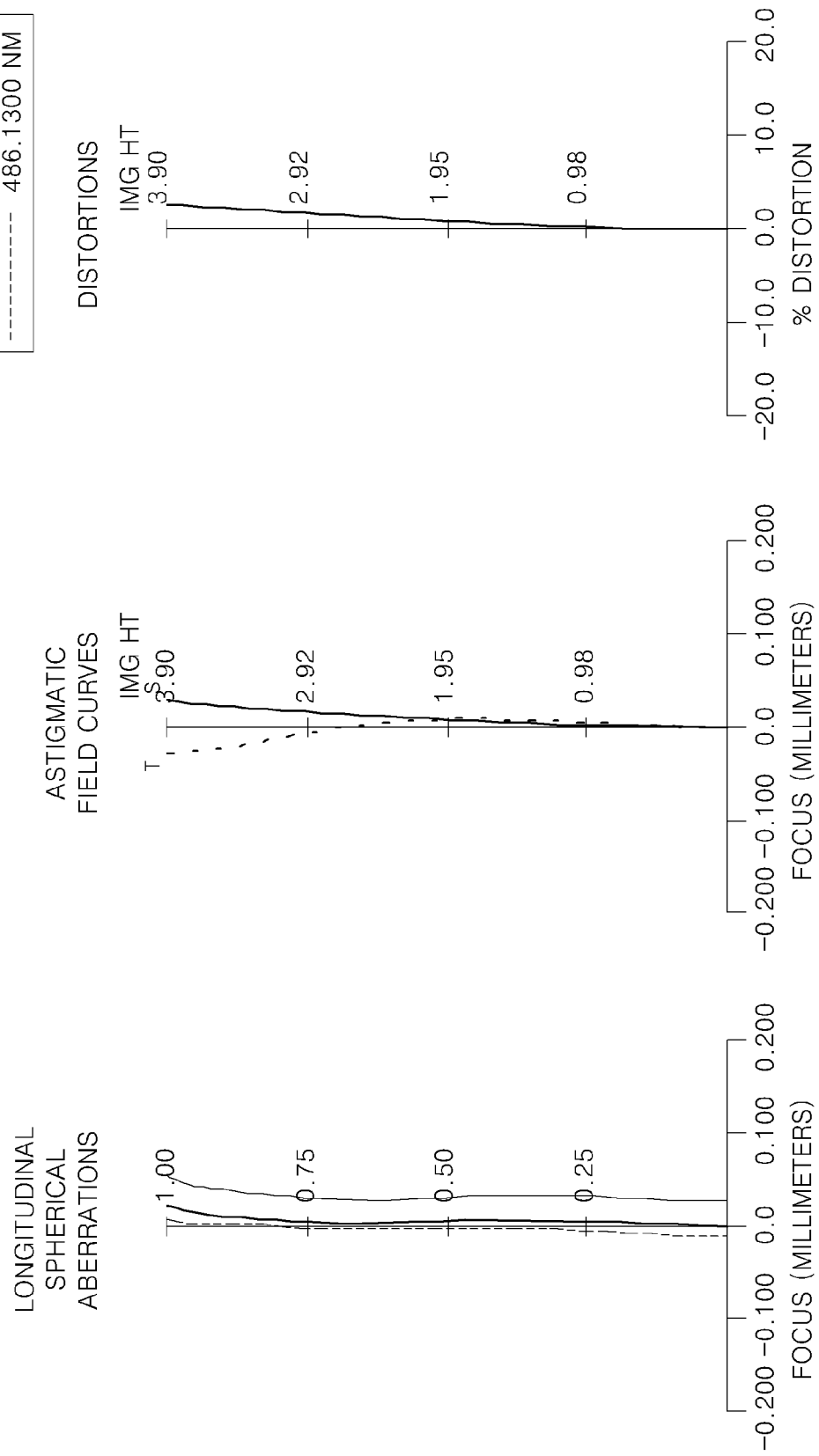

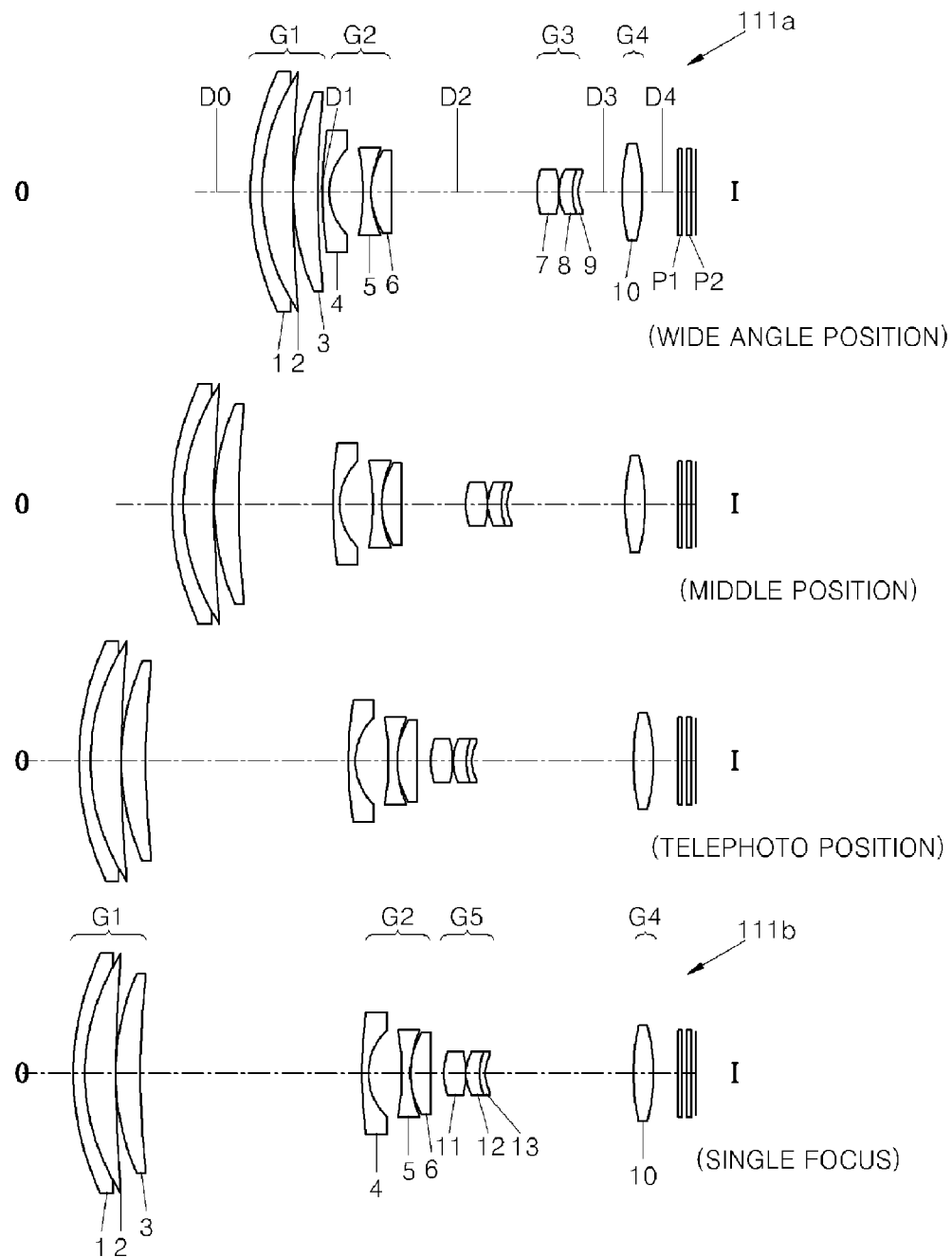

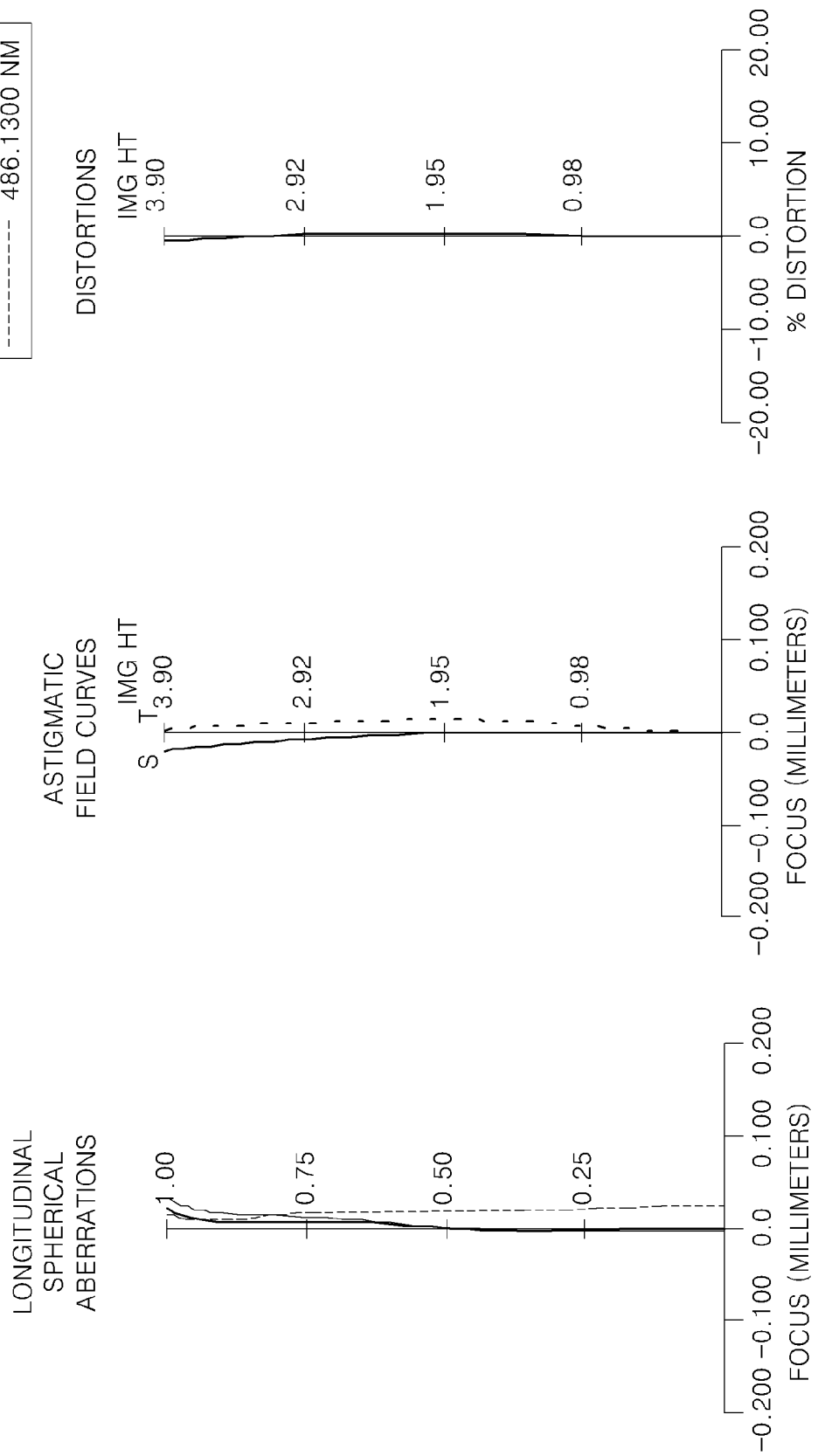

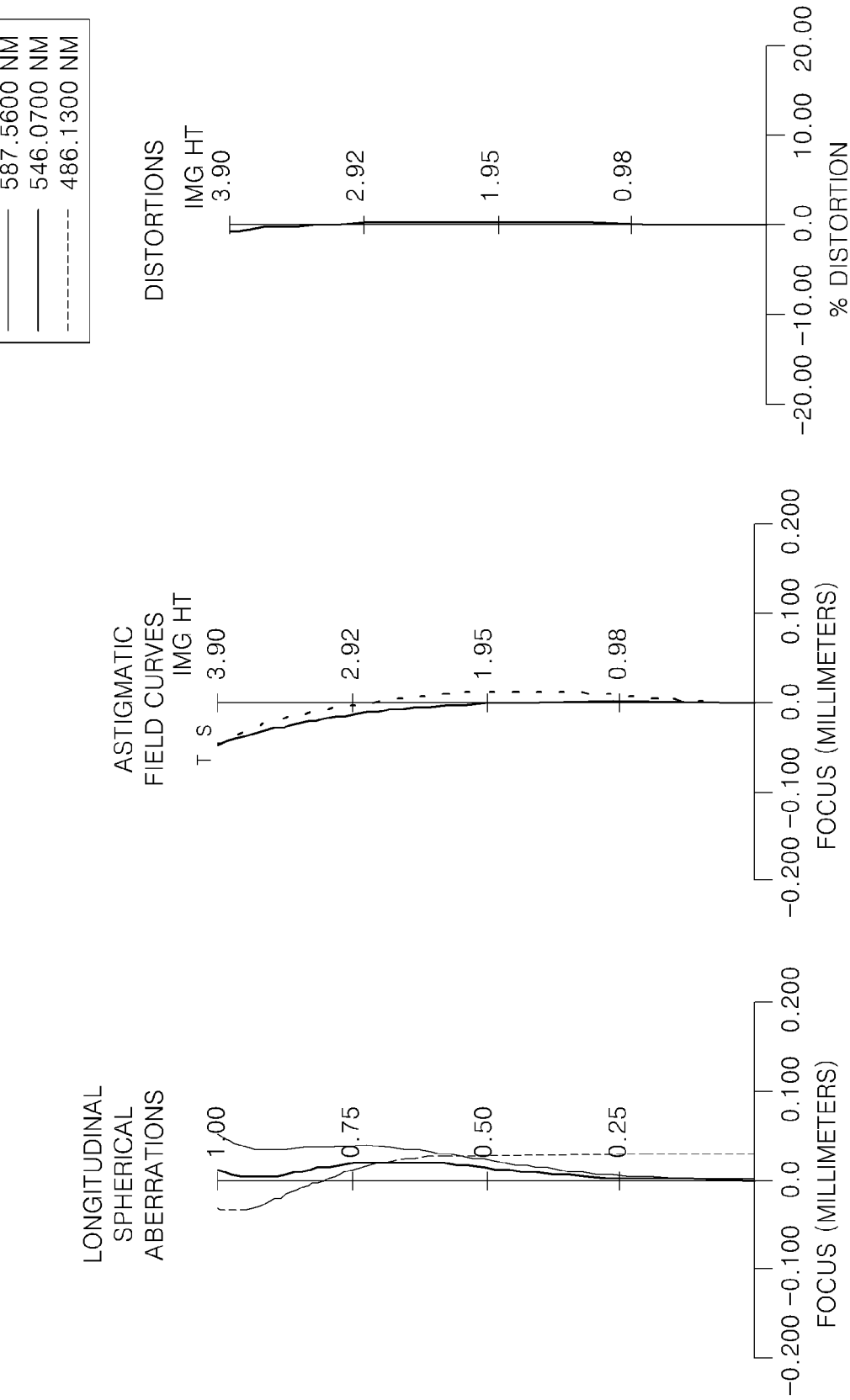

LENS SYSTEM AND IMAGE CAPTURING DEVICE HAVING THE SAME

CROSS-REFERENCE TO RELATED PATENT APPLICATION

This application claims the priority benefit of Korean Patent Application No. 10-2009-0112794, filed on Nov. 20, 2009, in the Korean Intellectual Property Office, the disclosure of which is incorporated herein in its entirety by reference.

BACKGROUND

1. Field of the Invention

Embodiments relate to a lens system having various focal lengths and an image capturing device having the lens system.

2. Description of the Related Art

Small size, light weight, and low cost are important considerations for image capturing devices employing a charge-coupled device (CCD) or a complementary metal-oxide semiconductor (CMOS), such as a digital camera or a hand-held phone camera module. Furthermore, various optical performances are also demanded. For example, optical characteristics of zoom lens systems differ according to types of lens systems used therein. Zoom lens systems are selected based on what scene an image capturing device is to capture. For example, it is desirable to use a wide-angle zoom lens system having excellent wide angle for capturing landscape images, and it is desirable to use a telephoto zoom lens system having a narrow image angle and a long focal length for capturing images of distant objects. Accordingly, a user has to spend more in order to capture various scenes by purchasing various zoom lens systems, and is inconvenienced in having to switch between zoom lens systems while capturing different images.

SUMMARY

Embodiments include a single lens system having various focal lengths.

Embodiments also include an image capturing device that embodies various focal lengths by using a single lens system.

According to an embodiment, a lens system includes a first lens group having a positive refractive power; a second lens group having a negative refractive power; a third lens group having a positive refractive power; a fourth lens group having a positive refractive power; and a fifth lens group that is exchangeable with the third lens group, wherein the first lens group, the second lens group, the third lens group, and the fourth lens group are sequentially arranged along an optical axis to form a first sub lens system, and the first lens group, the second lens group, the fifth lens group, and the fourth lens group are alternatively sequentially arranged along the optical axis to form a second sub lens system.

The first sub lens group may have a zoom magnification satisfying an Expression:

$$5.0 \leq ft/fw \leq 15.0,$$

where ft indicates a focal length of the first sub lens system at a telephoto position, and fw indicates a focal length of the first sub lens system at a wide angle position.

The second sub lens system may have a single focal length.

According to another embodiment, a lens system includes a zoom lens system that zooms from a wide angle position to a telephoto position, the zoom lens system including a plurality of lens groups; and an exchanging lens group that exchanges with at least one of the plurality of lens groups.

According to another embodiment, an image capturing device includes a lens system including a first lens group having a positive refractive power; a second lens group having a negative refractive power; a third lens group having a positive refractive power; a fourth lens group having a positive refractive power; and a fifth lens group that is exchangeable with the third lens group; and an imaging sensor that photoelectrically converts an image formed by the lens system. The first lens group, the second lens group, the third lens group, and the fourth lens group are sequentially arranged along an optical axis to form a first sub lens system, and the first lens group, the second lens group, the fifth lens group, and the fourth lens group are alternatively sequentially arranged along the optical axis to form a second sub lens system.

BRIEF DESCRIPTION OF THE DRAWINGS

The above and other features and advantages will become more apparent by describing in detail exemplary embodiments with reference to the attached drawings in which:

FIG. 4 is a diagram showing a lens system according to another embodiment at a wide angle position, a middle position, a telephoto position, and a single focus position;

FIGS. 5A, 5B, 5C, and 5D show aberrations of the lens system according to another embodiment of FIG. 4 at a wide angle position, a middle position, a telephoto position, and a single focus position, respectively;

FIG. 6 is a diagram showing a lens system according to another embodiment at a wide angle position, a middle position, a telephoto position, and a single focus position;

FIGS. 7A, 7B, 7C, and 7D show aberrations of the lens system according to another embodiment of FIG. 6 at a wide angle position, a middle position, a telephoto position, and a single focus position, respectively;

FIG. 8 is a diagram showing a lens system according to another embodiment at a wide angle position, a middle position, a telephoto position, and a single focus position;

FIGS. 9A, 9B, 9C, and 9D show aberrations of the lens system according to another embodiment of FIG. 8 at a wide angle position, a middle position, a telephoto position, and a single focus position, respectively.

DETAILED DESCRIPTION

Hereinafter, embodiments will be described in detail with reference to the attached drawings.

Figure 1:
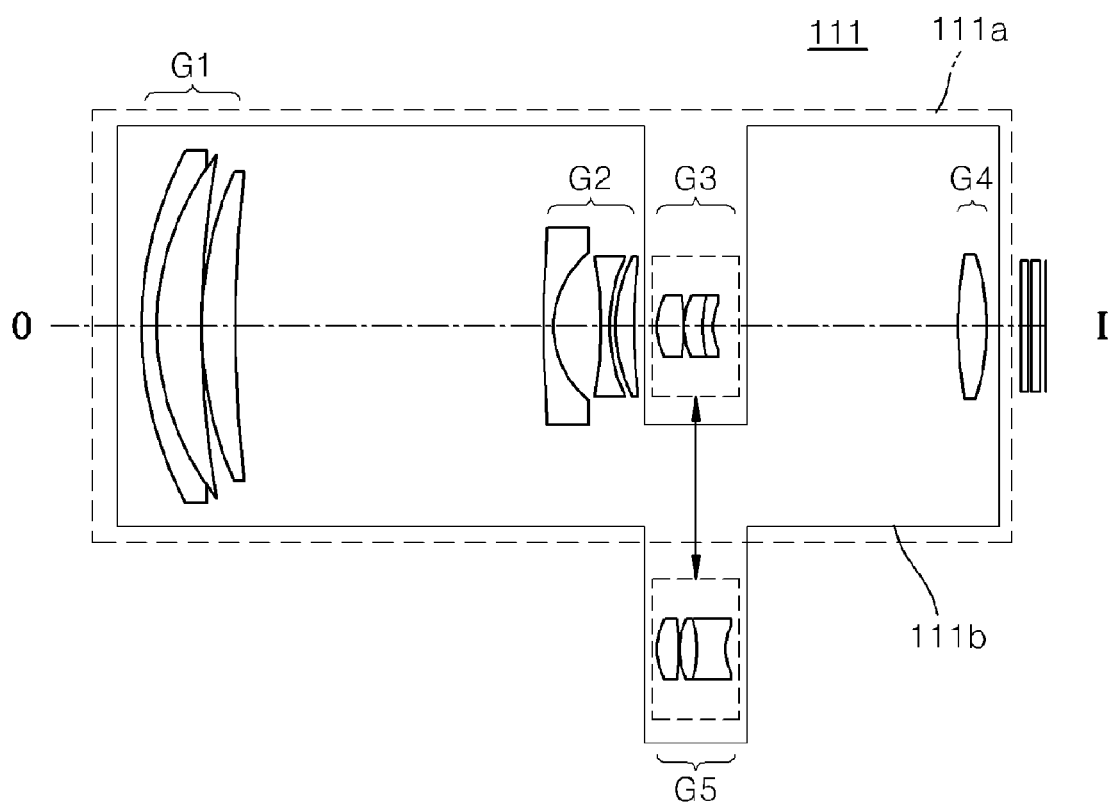
FIG. 1 is a diagram of a lens system according to an embodiment.

FIG. 1 is a diagram of a lens system 111 according to an embodiment. Referring to FIG. 1, the lens system 111 according to an embodiment includes a first sub lens system 111*a* that includes at least one of an exchangeable lens group and a second sub lens system 111*b* that includes another exchangeable lens group, wherein the exchangeable lens group of the second sub lens system 111*b* may exchange with the at least one of an exchangeable lens group of the first sub lens system 111*a*. The first sub lens system 111*a* and the second sub lens system 111b may share other lens groups. For example, the first sub lens system 111a may include a zoom lens system, and the second sub lens system 111b may include a single focus lens system. The second sub lens system 111b may have a focal length longer than those of the first sub lens system 111a at a telephoto position. Alternatively, the second sub lens system 111b may have a focal length shorter than those of the first sub lens system 111a at a wide angle position. Alternatively, the first sub lens system 111a and the second sub lens system 111b may have zoom lens systems with different zoom magnifications. Accordingly, the lens system 111 according to an embodiment may include both a zoom lens system and a single focus lens system, and thus various magnifications may be obtained from the single lens system. The first sub lens system 111a and the second sub lens system 111b share lens groups and an imaging device. Therefore, as compared to the conventional art when two separate lens systems are used, the lens system 111 requires a smaller number of parts, is advantageous for reduction in the size of the lens system, and may be fabricated with less cost.

Figure 2:
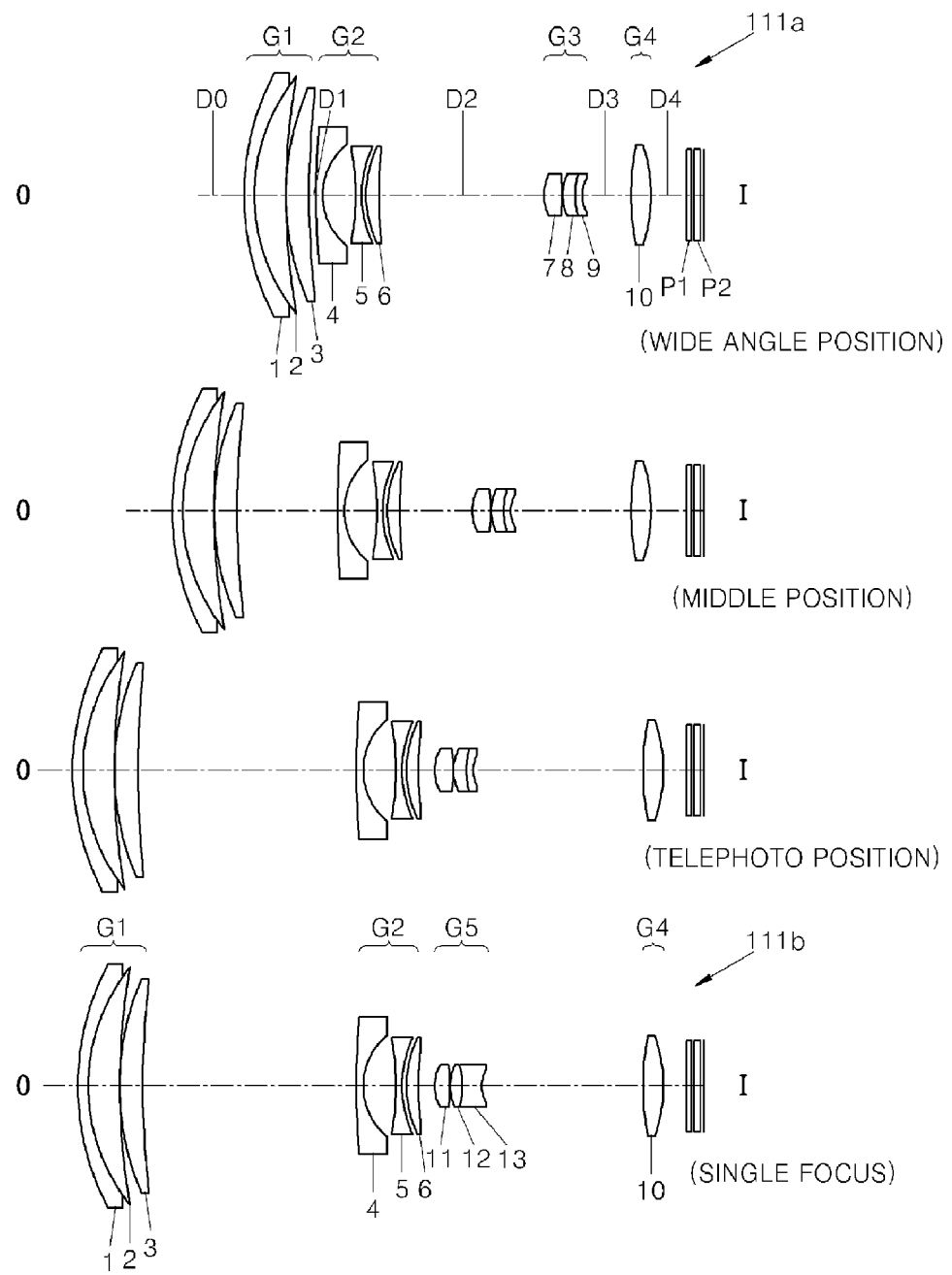
FIG. 2 is a diagram showing the lens system according to an embodiment of FIG. 1 at a wide angle position, a middle position, a telephoto position, and a single focus position.

FIG. 2 is a diagram showing the lens system 111 according to an embodiment of FIG. 1 at a wide angle position, a middle position, a telephoto position, and a single focus position. For example, the lens system 111 may include a first lens group G1, a second lens group G2, a third lens group G3, a fourth lens group G4, and a fifth lens group G5 that are sequentially arranged on an optical axis from an object side O to an image side I, and the fifth lens group G5 may exchange with the third lens group G3. The first through fourth lens groups G1 through G4 may configure the first sub lens system 111a, and the first, second, fifth, and fourth lens groups G1, G2, G5, and G4 may configure the second sub lens system 111b. When the first sub lens system 111a is switched with the second sub lens system 111b, the third lens group G3 may move out of the optical axis, and the fifth lens group G5 may move onto the optical axis.

For example, in the present embodiment, the first sub lens system 111a may include a plurality of lens groups capable of successively changing focal lengths, and a focal length that cannot be embodied by the first sub lens system 111a may be embodied by exchanging a part of the lens groups in the first sub lens systems 111a with another lens group.

The first lens group G1 may have a positive refractive power, the second lens group G2 may have a negative refractive power, the third lens group G3 may have a positive refractive power, and the fourth lens group G4 may have a positive refractive power. The fifth lens group G5 may have a positive refractive power.

The first sub lens system 111a may be a zoom lens system capable of zooming. When the first sub lens system 111a is zoomed from a wide angle position to a telephoto position, an interval D1 between the first lens group G1 and the second lens group G2 may increase and an interval D2 between the second lens group G2 and the third lens group G3 may decrease. The first sub lens system 111a may have a zoom magnification as shown in Expression 1 below.

$$5.0 \leq ft/fw \leq 15.0 \quad \text{[Expression 1]}$$

Here, ft is a focal length of the first sub lens system 111a at a telephoto position, and fw is a focal length of the first sub lens system 111a at a wide angle position.

The third lens group G3 may perform image blur correction by moving in a direction perpendicular to the optical axis. The fourth lens group G4 may perform focusing during a zooming operation.

The third lens group G3 moves out of the optical axis and the fifth lens group G5 moves onto the optical axis, such that the second sub lens system 111b may be configured to include the first lens group G1 having a positive refractive power, the second lens group G2 having a negative refractive power, the fifth lens group G5 having a positive refractive power, and the fourth lens group G5 having a positive refractive power, which are arranged from an object side O to an image side I. The second sub lens system 111b may be a single focus lens system. The second sub lens system 111b may have a focal length longer than those of the first sub lens system 111a. For example, the second sub lens system 111b may satisfy Expression 2 below.

$$1.1 \leq ff/ft \leq 1.5 \quad \text{[Expression 2]}$$

Here, ft indicates a focal length of the first sub lens system 111a at the telephoto position, and ff indicates a single focal length of the second sub lens system 111b.

As described above, the lens system 111 according to an embodiment may embody various focal lengths by exchanging a part of a plurality of lens groups with another lens group.

The lens system 111 according to an embodiment may satisfy Expression 3 below.

$$0.8 < (Lt3/ft) + (Lf3/ff) < 1.2 \quad \text{[Expression 3]}$$

Here, Lt3 indicates a distance from a first surface of a lens of the third lens group G3 closest to an object side O in the first sub lens system 111a to an imaging plane, whereas Lf3 indicates a distance from a first surface of a lens of the fifth lens group G5 in the second sub lens system 111b closest to the object side O to the imaging plane.

The lens system 111 according to an embodiment may satisfy Expression 4 below.

$$Lf3 \leq Lt3 \quad \text{[Expression 4]}$$

By satisfying Expressions 3 and 4, changes in length of the lens system 111 when the first sub lens system 111a is switched with the second sub lens system 111b may be reduced.

The lens system 111 according to an embodiment may satisfy Expression 5 below.

$$Lf1 \leq Lt1 \quad \text{[Expression 5]}$$

Here, Lt1 indicates a distance from a first surface of a lens of the first lens group G1 closest to the object side in the first sub lens system 111a to the imaging plane, whereas Lf1 indicates a distance from a first surface of a lens of the first lens group G1 closest to the object side in the second sub lens system 111b to the imaging plane. When Expression 5 above is satisfied, the overall length of the lens system 111 does not increase even when using the second sub lens system 111b having focal lengths longer than that of the first sub lens system 111a, and thus the size of the lens system 111 may be reduced.

The lens system 111 according to an embodiment may satisfy Expression 6 below.

$$5.0 < ff/f3 < 6.5 \quad \text{[Expression 6]}$$

Here, ff3 indicates a focal length of the fifth lens group G5 in the second sub lens system 111b. By satisfying Expression 6 above, the optical configuration of the fifth lens group G5 may be simplified.

The first lens group G1 may include at least one doublet lens having a negative lens 1 and a positive lens 2. The first lens group G1 may include the doublet lens 1 and 2 having a positive refractive power and a spherical lens 3 having a positive refractive power sequentially arranged on the optical axis from the object side O to the image side I. The first lens group G1 may include at least one aspheric lens or a hybrid lens.

The lens 1 of the first lens group G1, which is closest to the object side O, may satisfy Expression 7 below.

$$1.9 \leq Nd1 \quad \text{[Expression 7]}$$

Here, Nd1 indicates the refractive index of the lens 1 of the first lens group G1.

The first lens group G1 may include at least one lens satisfying Expression 8 below.

$$80 \leq Vd1 \quad \text{[Expression 8]}$$

Here, Vd1 indicates an Abbe number of at least one lens in the first lens group G1. If at least one lens in the first lens group G1 has an Abbe number satisfying Expression 8 above, optical performance of the lens system 111 may be improved, optical performance may be maintained when the first sub lens system 111a is switched with the second sub lens system 111b, and chromatic aberration may be corrected.

The second lens group G2 may include at least one doublet lens having a negative lens and a positive lens. For example, the second lens group G2 may include a lens 4 having a negative refractive power, a lens 5 having a negative refractive power, and a lens 6 having a positive refractive power. The second lens group G2 may include at least one aspheric lens or hybrid lens.

The second lens group G2 may satisfy Expression 9 below.

$$1.88 \leq Nd2 \quad \text{[Expression 9]}$$

Here, Nd2 indicates the refractive index of the lens 6 of the second lens group G2, which is closest to the image side I.

The second lens group G2 may include at least one lens satisfying Expression 10 below.

$$20 \leq Vd2 \leq 50 \quad \text{[Expression 10]}$$

Here, Vd2 indicates an Abbe number of at least one lens of the second lens group G2. If at least one lens in the second lens group G2 has an Abbe number satisfying Expression 10 above, the optical performance of the lens system 111 may be improved.

The third lens group G3 may include at least one doublet lens having a positive lens 8 and a negative lens 9. For example, the third lens group G3 may include a positive lens 7 and the doublet lens 8 and 9. The third lens group G3 may include at least one aspheric lens or hybrid lens.

The fourth lens group G4 may include one lens 10. The lens 10 may be a positive lens. The fourth lens group G4 may include at least one aspheric lens or hybrid lens.

The fifth lens group may have a positive refractive power as a total and include at least one doublet lens having a positive lens 12 and a negative lens 13. For example, the fifth lens group G5 may include a lens 11 having a positive refractive power and the doublet lens 12 and 13 having a negative refractive power as a total sequentially arranged on the optical axis from the object side O to the image side I.

Filters P1 and P2 may be arranged between the fourth lens group G4 and the image side I.

The term 'aspheric' with respect to a lens system according to the embodiments is as described below.

An aspheric shape may be expressed as shown in Expression 11 below, wherein a direction along the optical axis is referred to as an x-axis direction, directions perpendicular to the optical axis direction are referred to as a y-axis direction, and a direction in which light travels is referred to as a positive sign. Here, x indicates a distance from a vertex of a lens along the optical axis, y indicates a distance from the vertex in the directions perpendicular to the optical axis, K indicates a conic constant, A, B, C, and D indicate aspheric coefficients, and c indicates the reciprocal (1/R) of the radius of the curvature at the vertex of the lens.

$$x = \frac{cy^2}{1 + \sqrt{1 - (K+1)c^2 y^2}} + Ay^4 + By^6 + Cy^8 + Dy^{10} \quad \text{[Expression 11]}$$

Hereinafter, various designs of lens systems according to various embodiments are shown. Here, EFL indicates effective focal length, FOV indicates a viewing angle, F/# indicates an F number, and D0, D1, D2, D3, and D4 indicate variable distances. The unit of EFL, distances between lenses and thickness of lenses is mm and the unit of the viewing angle is degree. In each of the diagrams, the same reference numerals are assigned to like lenses.

[First Embodiment]

FIG. 2 is a diagram showing the lens system 111 according to an embodiment of FIG. 1 at a wide angle position, a middle position, a telephoto position, and a single focus position. The illustrated wide angle position, middle position, and telephoto position correspond to the first sub lens system 111a, while the illustrated single focus position corresponds to the second sub lens system 111b.

<First Sub Lens System 111a>

| Lens Surface | RC | Thickness | Nd | Abbe Number |
|---|---|---|---|---|
| OBJECT | INFINITY | D0 | | |
| S1 | 23.404 | 0.93 | 1.931644 | 22.2224 |
| S2 | 17.140 | 2.71 | 1.497436 | 81.4906 |
| S3 | 56.074 | 0.10 | | |
| S4 | 26.611 | 1.88 | 1.822682 | 45.0985 |
| S5 | 91.000 | D1 | | |
| S6 | 86.195 | 0.60 | 1.872825 | 41.4325 |
| S7 | 5.994 | 2.66 | | |
| S8 | −80.217 | 0.66 | 1.798889 | 47.2668 |
| S9 | 8.536 | 0.28 | | |
| S10 | 9.735 | 1.19 | 1.922860 | 20.8804 |
| S11 | 99.000 | D2 | | |
| S12 | INFINITY | 0.30 | | |
| S13(ST) | 4.643 | 1.53 | 1.579828 | 66.1344 |
| S14 | −14.681 | 0.10 | | |
| S15 | 5.628 | 1.14 | 1.651599 | 58.4039 |
| S16 | 8.856 | 0.45 | 1.856256 | 25.9977 |
| S17 | 3.206 | D3 | | |
| S18 | 35.037 | 1.67 | 1.496997 | 81.6084 |
| S19 | −12.728 | D4 | | |
| S20 | INFINITY | 0.30 | 1.516798 | 64.1983 |
| S21 | INFINITY | 0.30 | | |
| S22 | INFINITY | 0.50 | 1.516798 | 64.1983 |
| S23 | INFINITY | 0.40 | | |
| IMAGE | INFINITY | | | |

(*RC: Radius of Curvature/Nd: Refractive Index)

Aspheric coefficients of the first sub lens system 111a of the lens system 111 according to the current embodiment are shown below.

|     | K | A | B | C | D |
|-----|---|---|---|---|---|
| S8  | −38.08605 | −1.933574e−003 | 1.102705e−004 | −2.367617e−006 | 1.321229e−008 |
| S9  | −6.11824  | −8.930660e−004 | 1.006160e−004 | −2.016335e−006 | 0.000000e+000 |
| S13 | −0.92295  | 2.541269e−004  | −1.302114e−005 | 1.165031e−005 | −1.736424e−007 |
| S14 | −9.34473  | 5.361785e−004  | −1.219555e−005 | 1.155170e−005 | 0.000000e+000 |
| S18 | 0.49483   | 2.748435e−004  | 0.000000e+000 | 0.000000e+000 | 0.000000e+000 |
| S19 | −0.99753  | 5.341231e−004  | −1.101354e−005 | 0.000000e+000 | 0.000000e+000 |

<Second Sub Lens System 111b>

| Lens Surface | RC | Thickness | Nd | Abbe Number |
|---|---|---|---|---|
| S13(ST) | 4.558 | 1.20 | 1.502319 | 80.2164 |
| S14 | −8.758 | 0.20 | | |
| S15 | 5.046 | 1.01 | 1.685490 | 56.0522 |
| S16 | −7.266 | 1.63 | 1.886073 | 40.0927 |

(*RC: Radius of Curvature/Nd: Refractive Index)

Aspheric coefficients of the second sub lens system 111b of the lens system 111 according to the current embodiment are shown below.

|     | K | A | B | C | D |
|-----|---|---|---|---|---|
| S13 | −0.83453 | 3.906883e−004 | −8.590593e−005 | 1.044172e−005 | 1.225457e−006 |
| S14 | −4.65031 | 1.283505e−004 | −1.270635e−004 | 2.313506e−005 | 0.000000e+000 |

The first sub lens system 111a and the second sub lens system 111b share surfaces S1 through S12 and surfaces S17 through IMAGE.

|     | Wide Angle Position | Middle Position | Telephoto Position | Single Focus Position |
|-----|---|---|---|---|
| EFL | 4.380 | 13.140 | 41.172 | 44.238 |
| FOV | 41.682 | 16.531 | 5.411 | 5.038 |
| F/# | 3.240 | 4.835 | 5.897 | 6.650 |
| D0  | INFINITY | INFINITY | INFINITY | INFINITY |
| D1  | 0.575 | 8.572 | 18.756 | 18.229 |
| D2  | 13.831 | 5.768 | 1.100 | 1.100 |
| D3  | 4.313 | 10.455 | 14.633 | 13.787 |
| D4  | 3.104 | 3.000 | 2.100 | 2.100 |

Figure 3A:
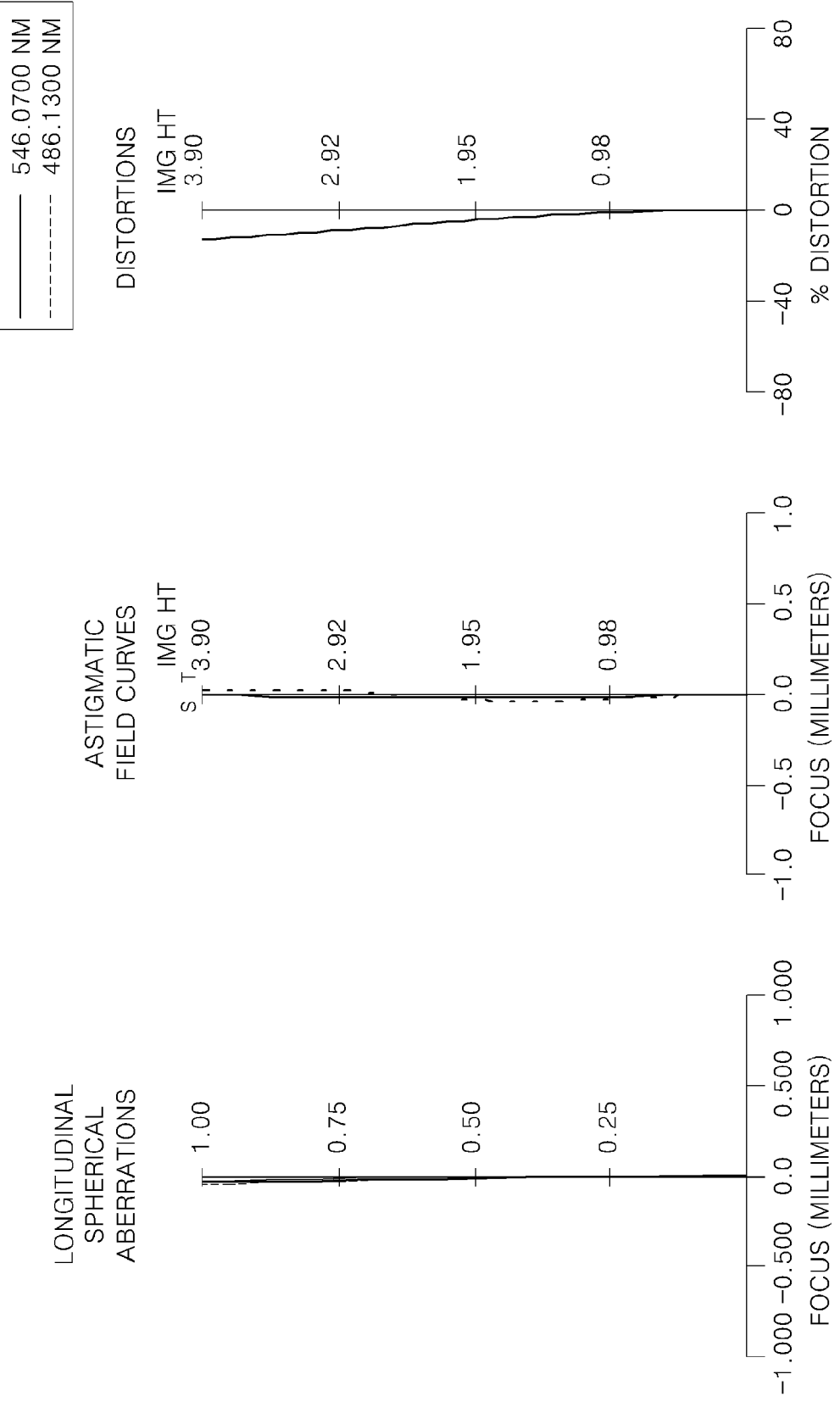
FIGS. 3A, 3B, 3C, and 3D show aberrations of the lens system according to an embodiment of FIG. 1 at a wide angle position, a middle position, a telephoto position, and a single focus position, respectively.
Figure 3B:
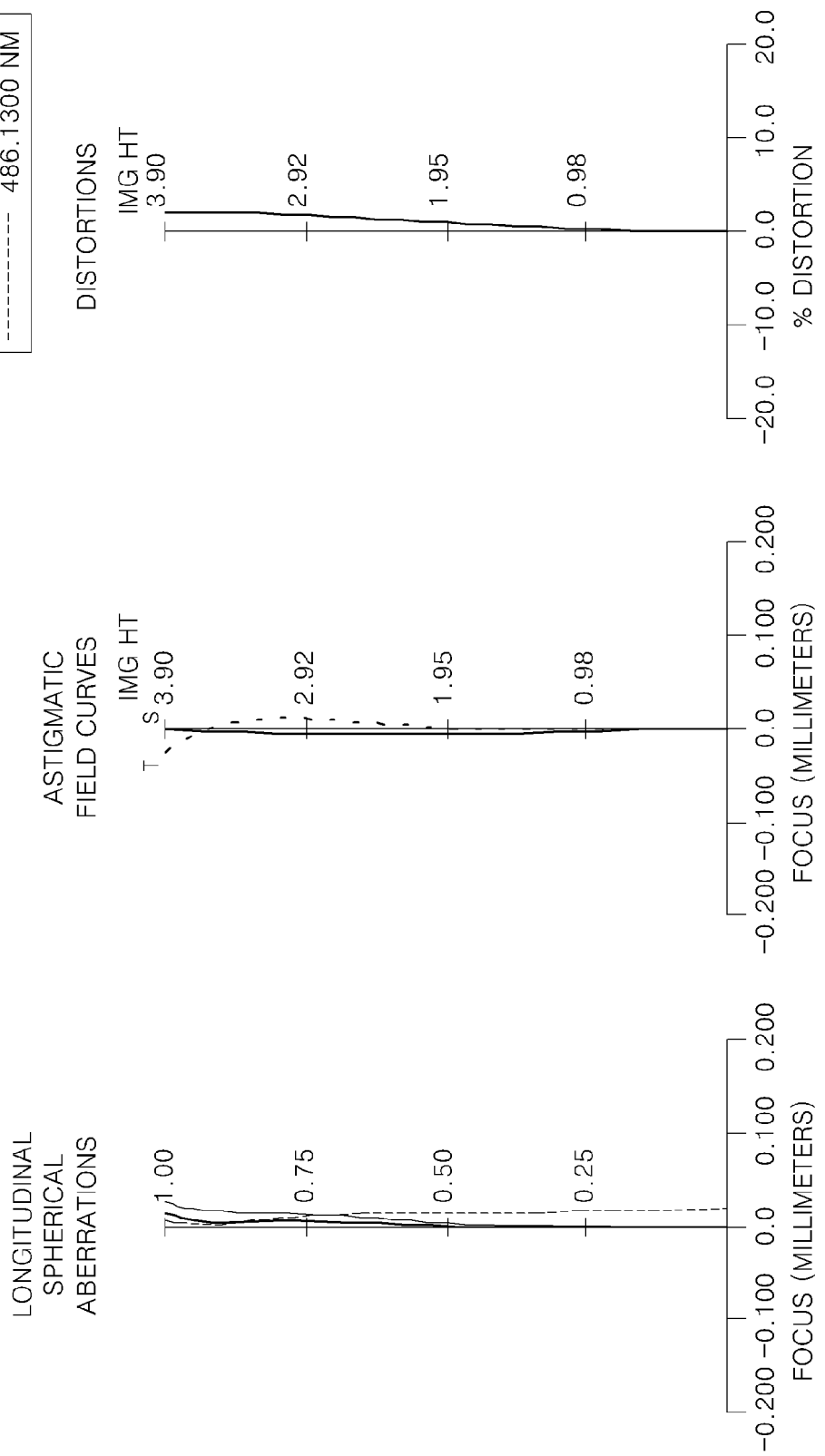
Figure 3C:
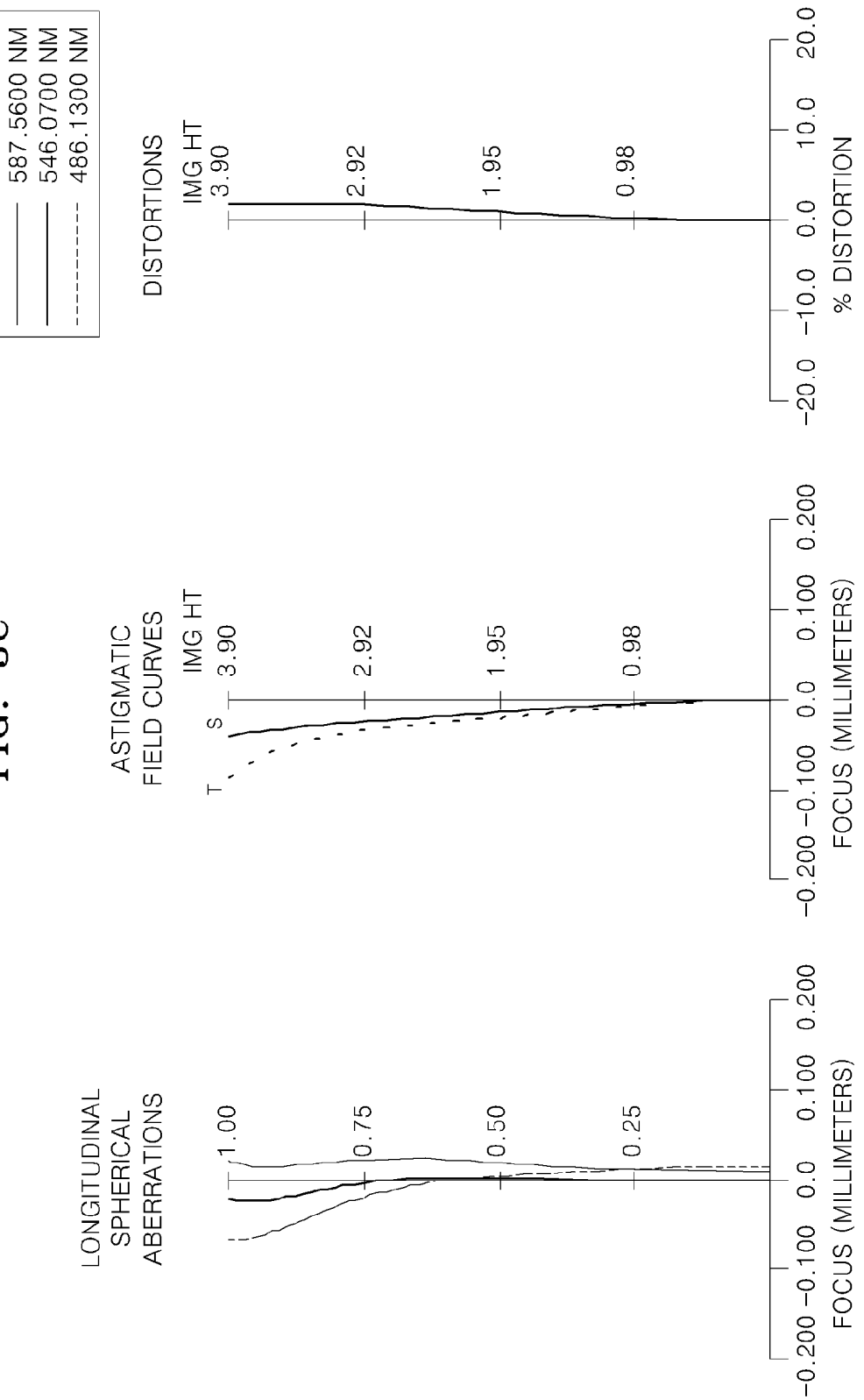
Figure 3D:
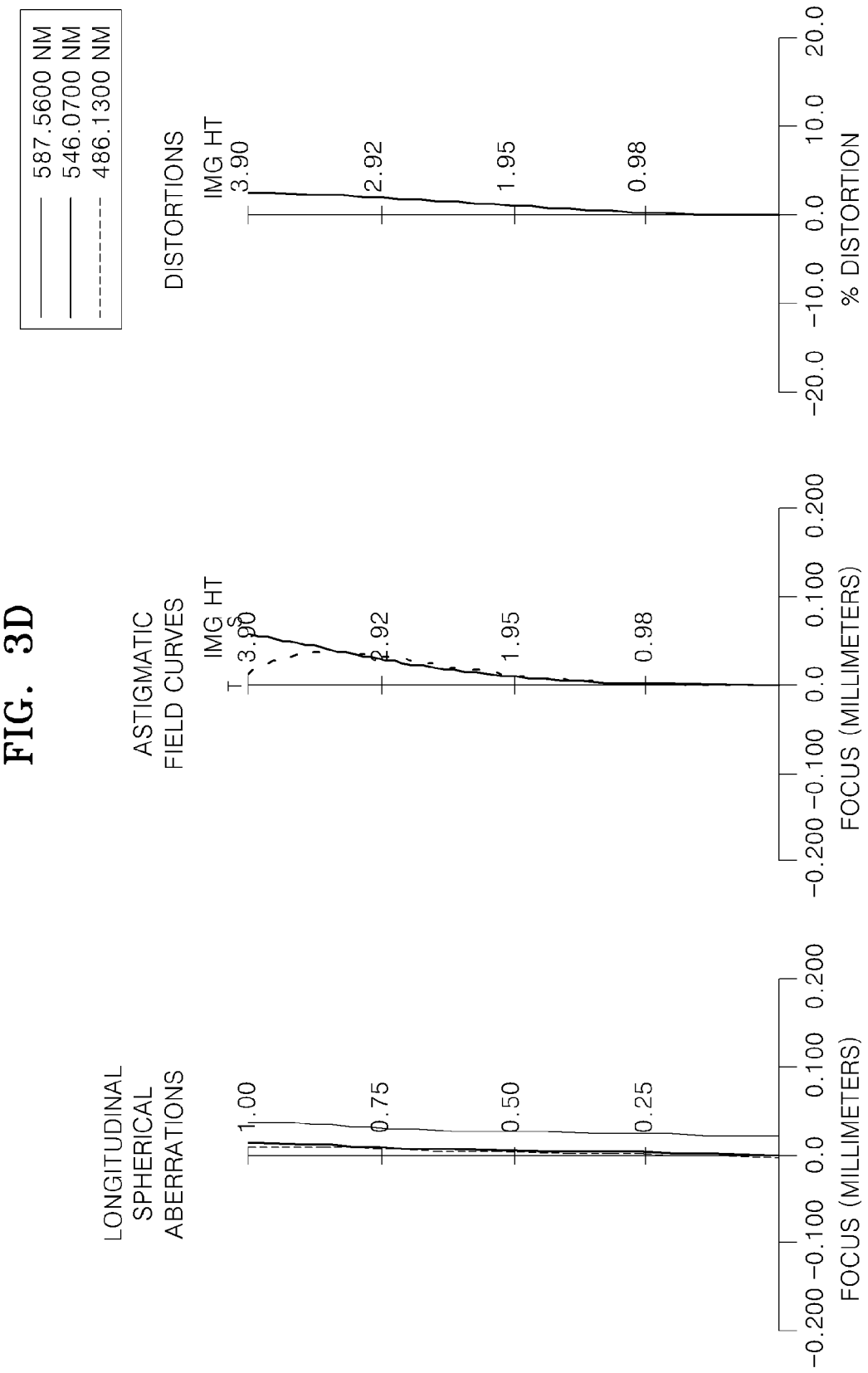
Figure 5A:
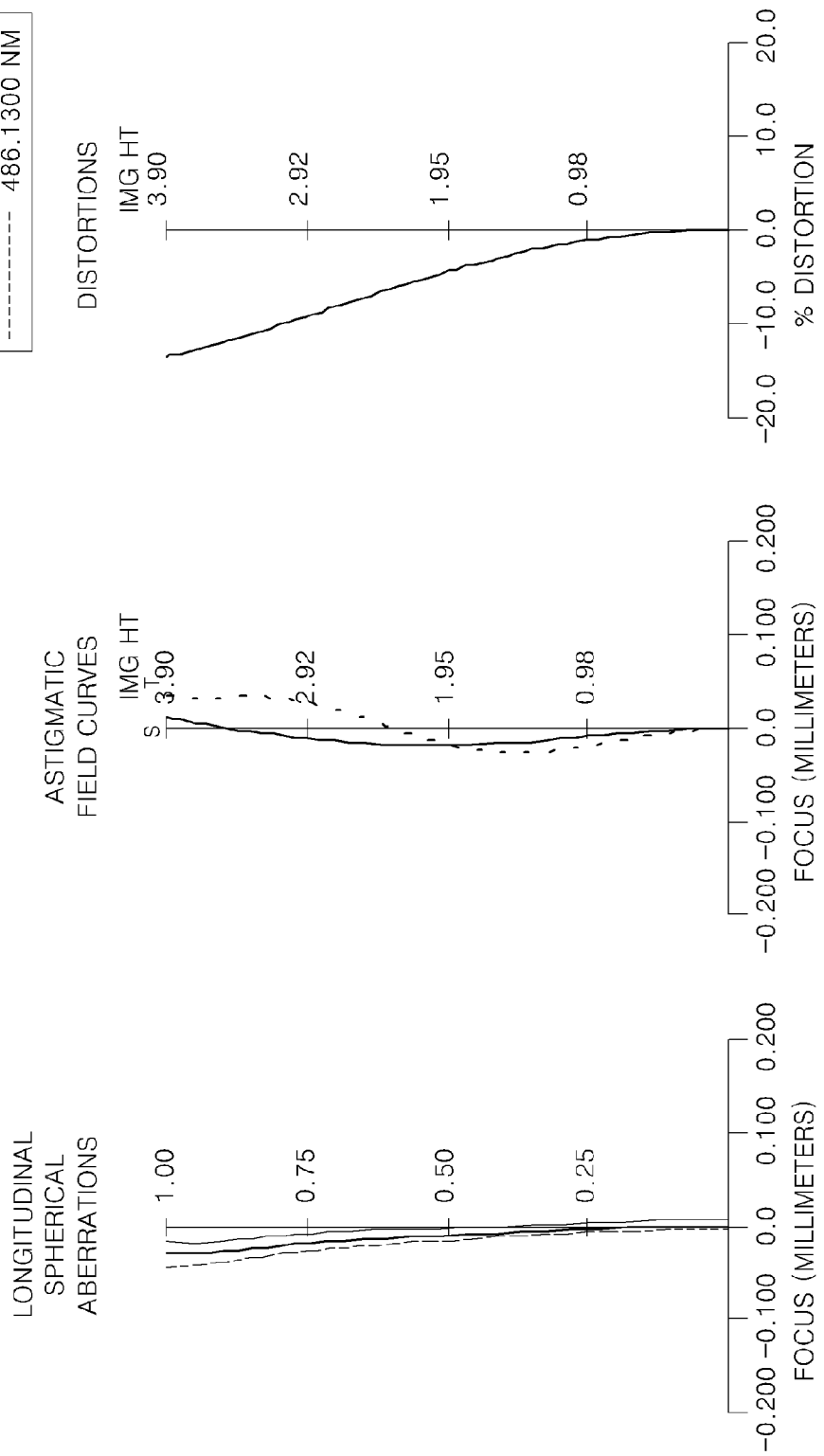
Figure 5B:
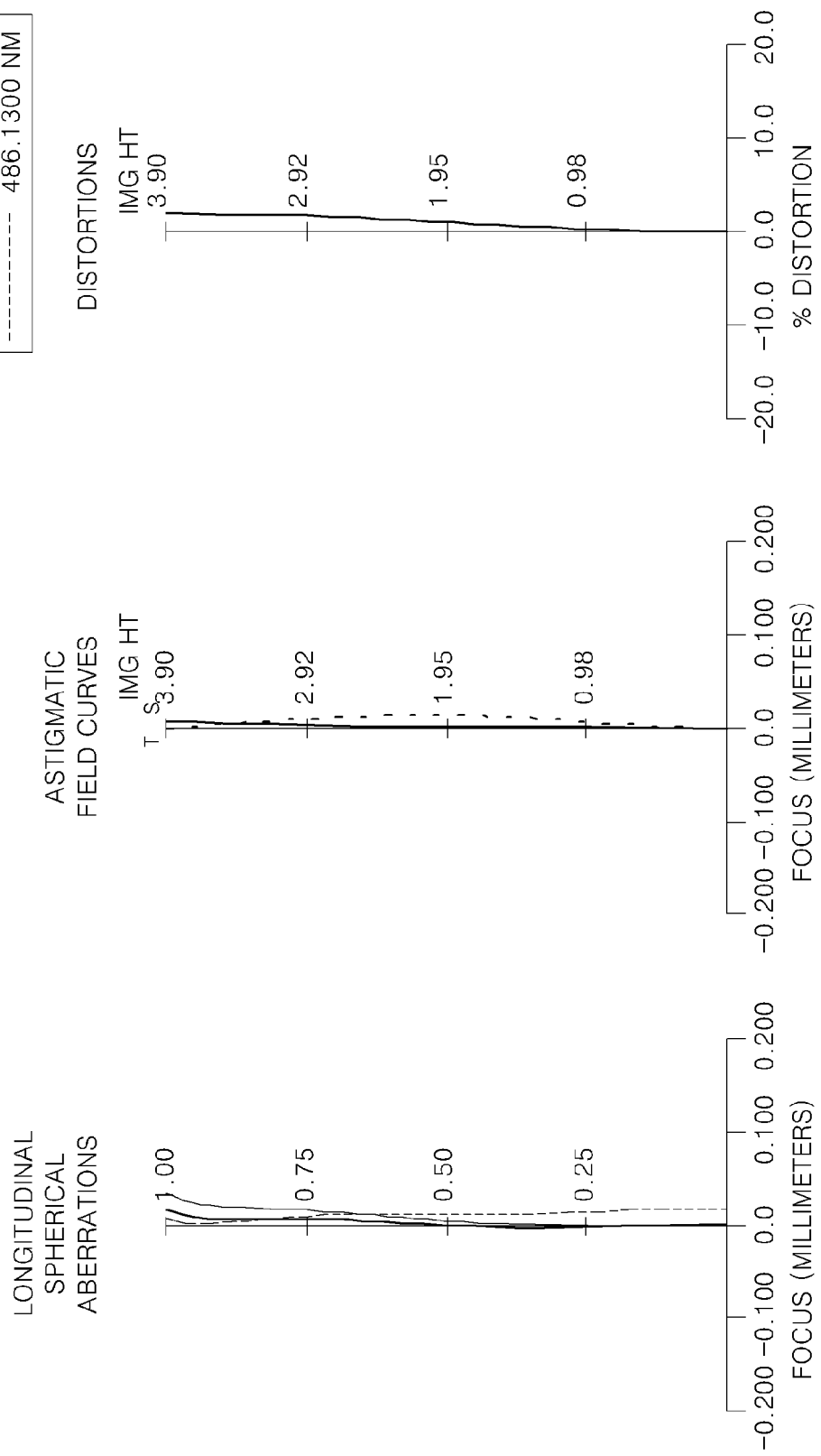
Figure 5C:
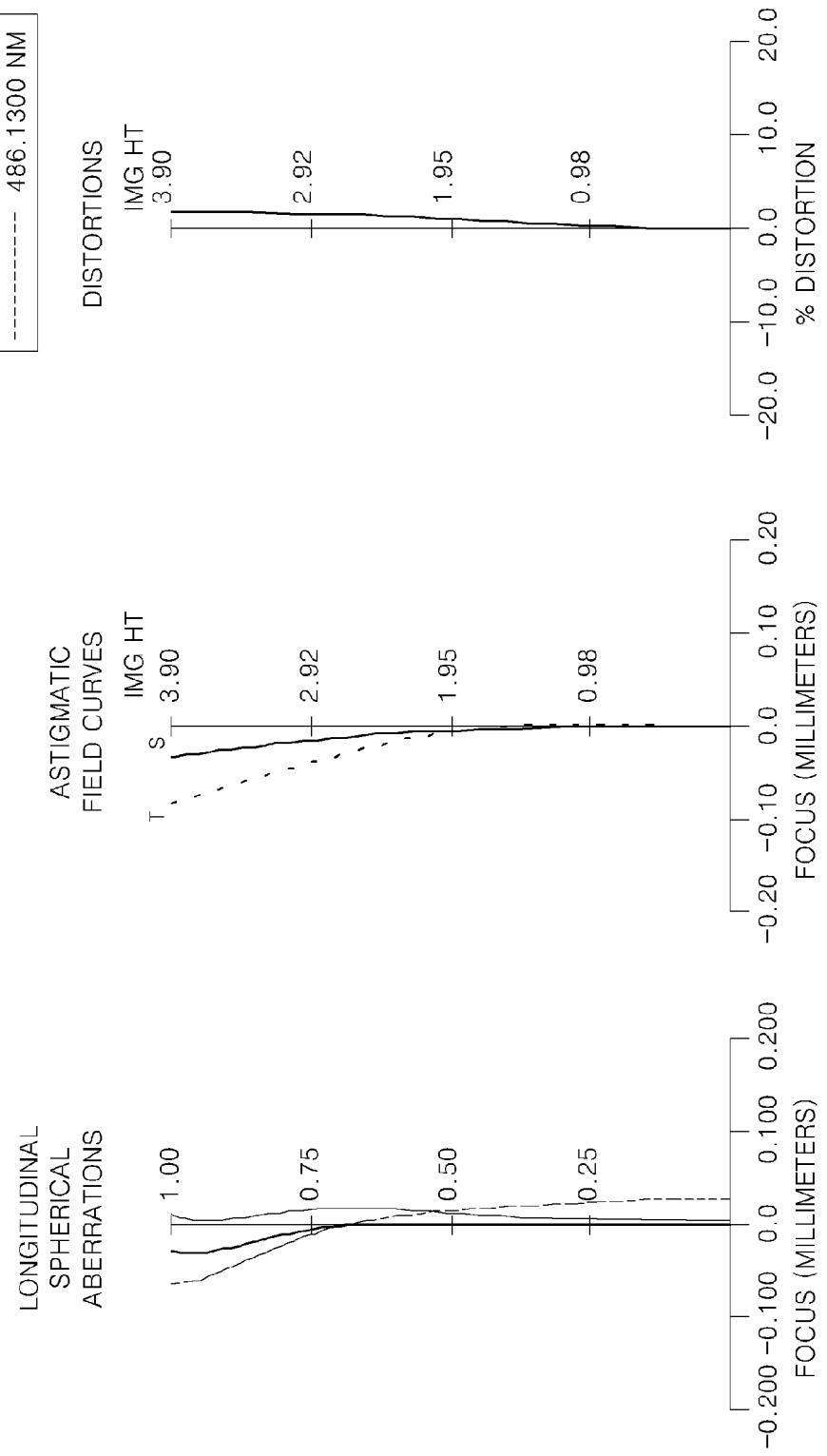
Figure 7A:
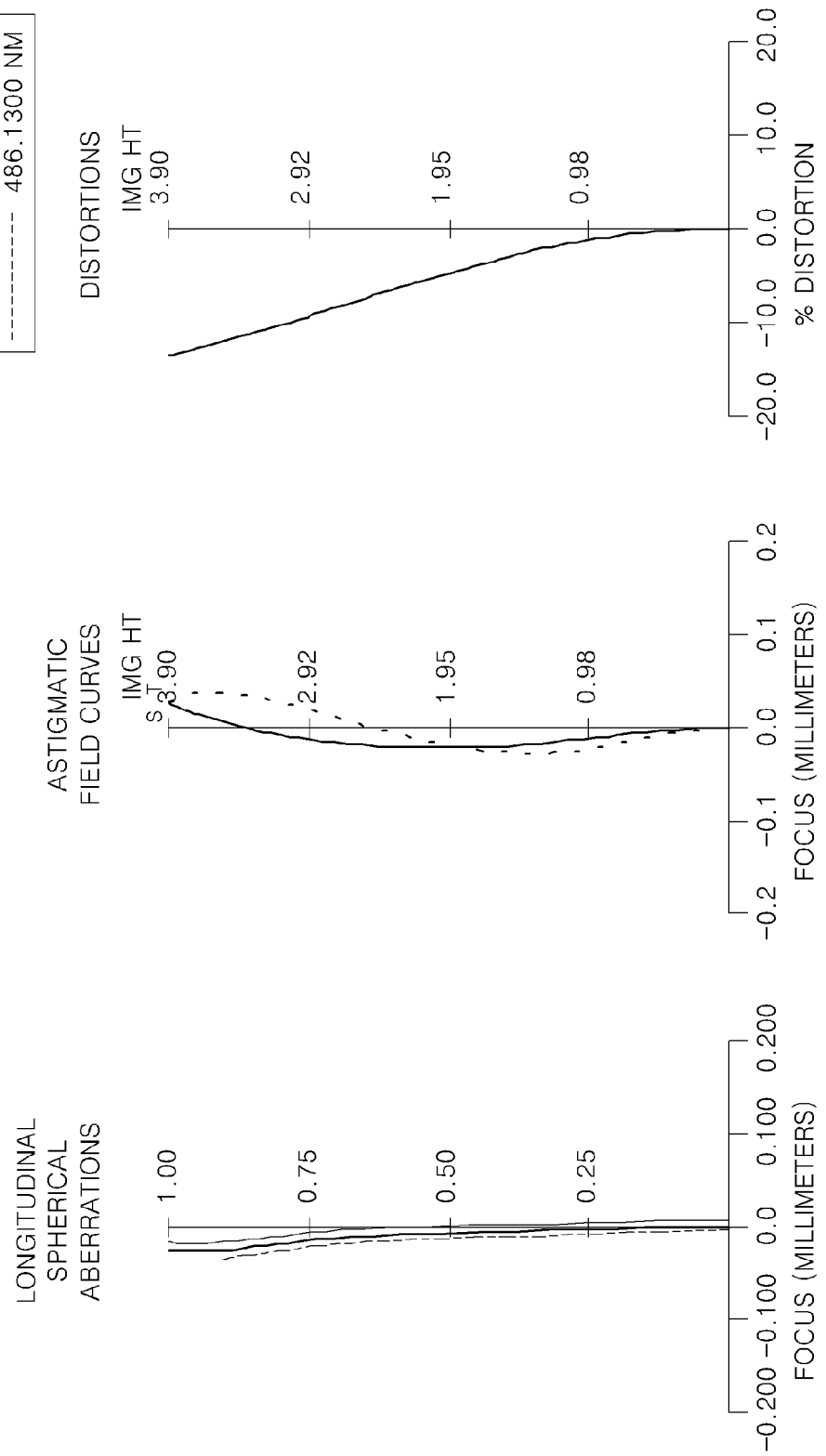
Figure 7C:
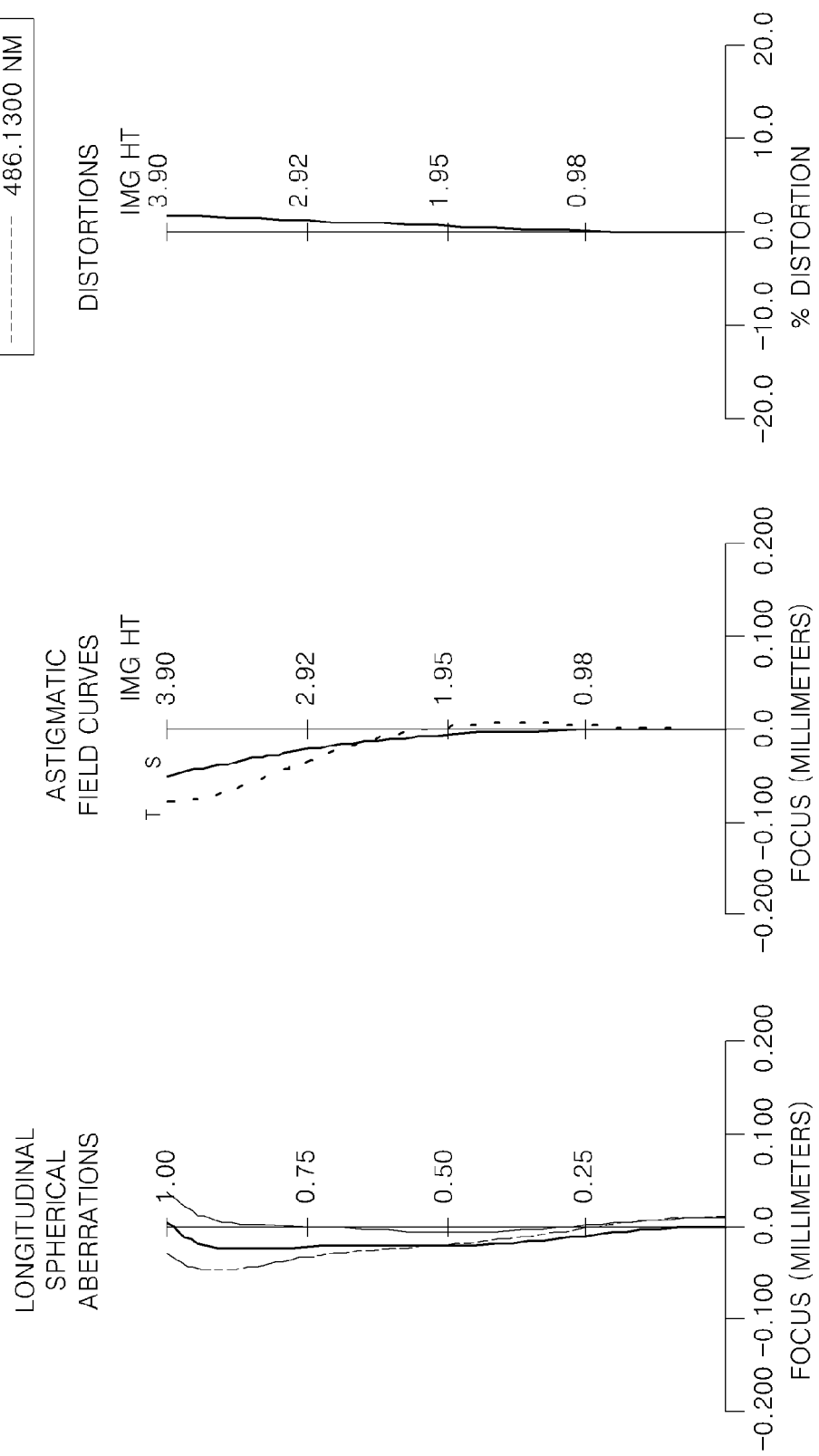
Figure 9A:
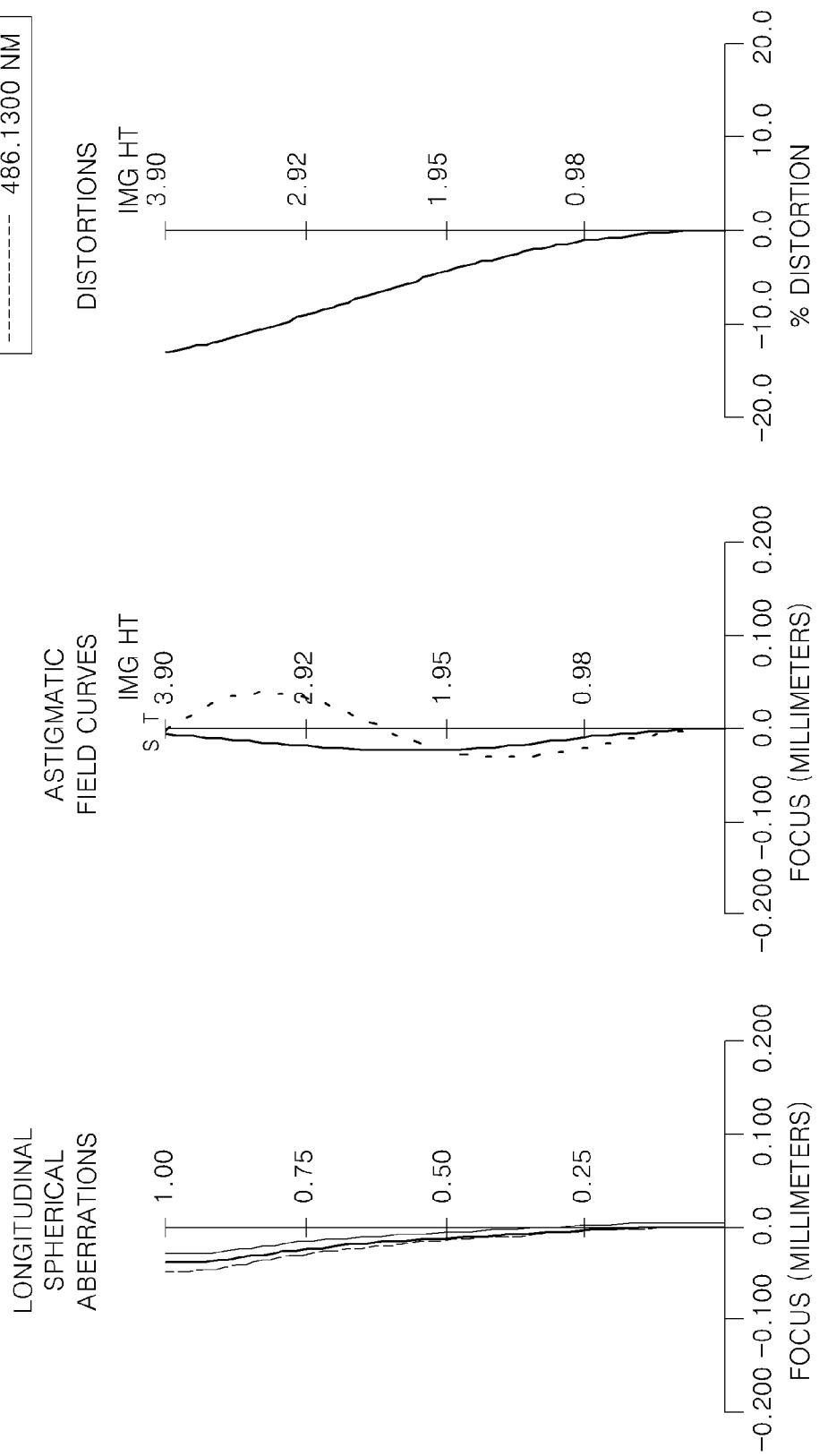
Figure 9D:
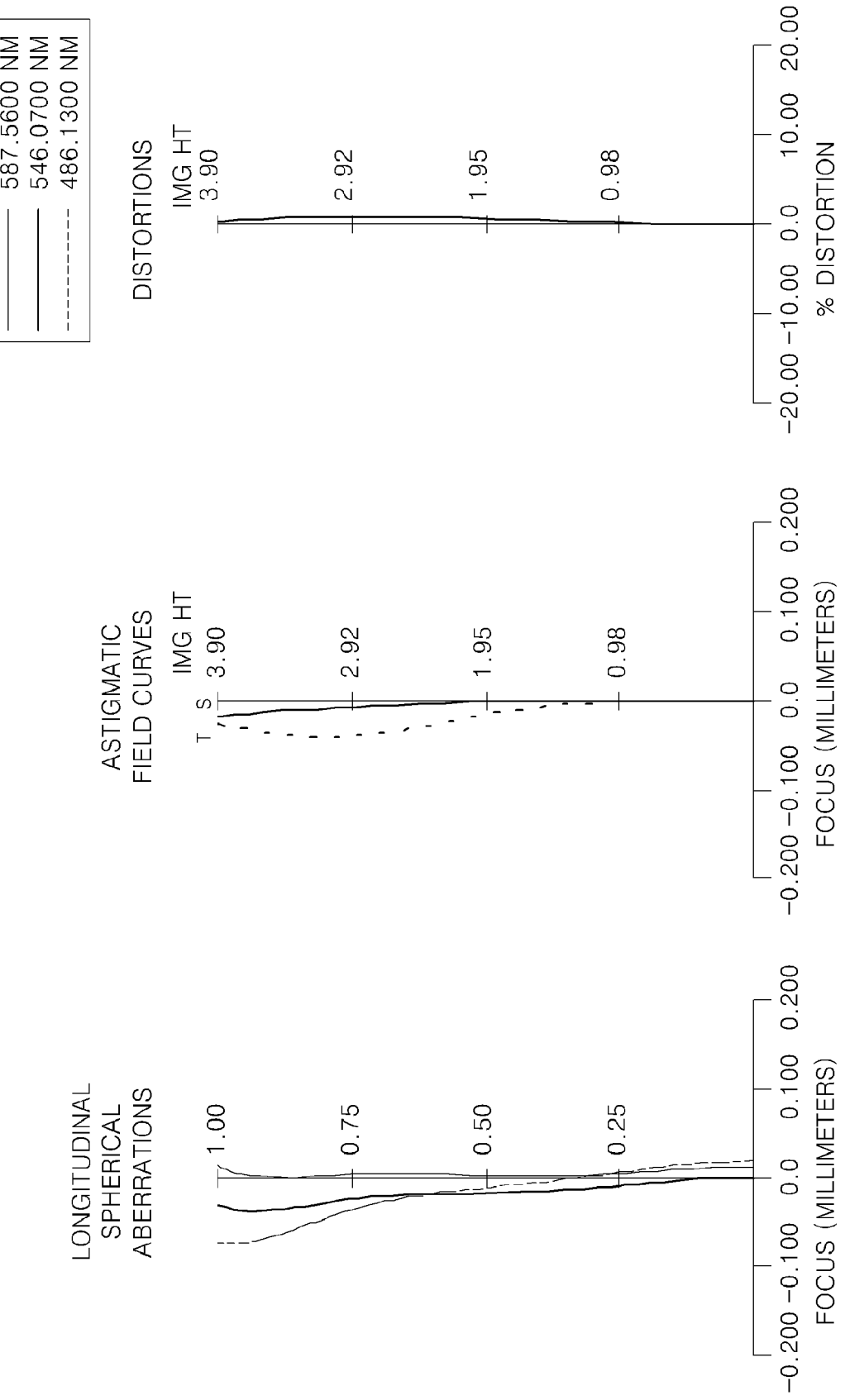

FIGS. 3A, 3B, 3C, and 3D show aberrations of the lens system according to an embodiment of FIG. 1 at the wide angle position, the middle position, the telephoto position, and the single focus position, respectively. FIG. 3A shows longitudinal spherical aberrations, astigmatic field curves, and distortions of the first sub lens system 111a shown in FIG. 2 at the wide angle position. The astigmatic field curves include tangential field curves T and sagittal field curves S. A vertical axis in the distortion aberration indicates an image height IH. FIGS. 3B and 3C respectively show the longitudinal spherical aberrations, the astigmatic field curves, and the distortions of the first sub lens system 111a shown in FIG. 2 at the middle position and telephoto position. FIG. 3D shows the longitudinal spherical aberrations, the astigmatic field curves, and the distortions of the second sub lens system 111b.

[Second Embodiment]

FIG. 4 is a diagram showing the lens system 111 according to another embodiment at a wide angle position, a middle position, a telephoto position, and a single focus position. The illustrated wide angle position, middle position, and telephoto position correspond to the first sub lens system 111a, while the illustrated single focus position corresponds to the second sub lens system 111b.

<First Sub Lens System 111a>

| Lens Surface | RC | Thickness | Nd | Abbe Number |
|---|---|---|---|---|
| OBJECT | INFINITY | D0 | | |
| S1 | 23.422 | 0.90 | 1.931046 | 21.9041 |
| S2 | 17.154 | 2.73 | 1.497601 | 81.4466 |
| S3 | 56.050 | 0.10 | | |
| S4 | 26.563 | 1.89 | 1.821618 | 45.1887 |
| S5 | 91.000 | D1 | | |
| S6 | 94.751 | 0.60 | 1.873083 | 40.8521 |
| S7 | 6.046 | 2.69 | | |
| S8 | −76.812 | 0.61 | 1.798760 | 47.2795 |
| S9 | 8.596 | 0.27 | | |
| S10 | 9.764 | 1.66 | 1.922860 | 20.8804 |
| S11 | 95.084 | D2 | | |
| S12 | INFINITY | 0.30 | | |
| S13(ST) | 4.644 | 1.54 | 1.579702 | 60.2527 |
| S14 | −14.698 | 0.10 | | |
| S15 | 5.630 | 1.14 | 1.651626 | 58.4018 |
| S16 | 8.875 | 0.45 | 1.856598 | 24.7347 |
| S17 | 3.205 | D3 | | |
| S18 | 49.377 | 1.71 | 1.497060 | 81.5914 |
| S19 | −11.633 | D4 | | |
| S20 | INFINITY | 0.30 | 1.516798 | 64.1983 |
| S21 | INFINITY | 0.30 | | |
| S22 | INFINITY | 0.50 | 1.516798 | 64.1983 |
| S23 | INFINITY | 0.40 | | |
| IMAGE | INFINITY | | | |

(*RC: Radius of Curvature/Nd: Refractive Index)

Aspheric coefficients of the first sub lens system 111a of the lens system 111 according to the current embodiment are shown below.

| Lens Surface | K | A | B | C | D |
|---|---|---|---|---|---|
| S8 | −50.00000 | −2.060463e−003 | 1.216407e−004 | −2.701659e−006 | 1.605631e−008 |
| S9 | −6.61109 | −9.372677e−004 | 1.074454e−004 | −2.192468e−006 | 0.000000e+000 |
| S13 | −0.92312 | 2.542013e−004 | −1.709538e−005 | 1.210068e−005 | −2.860370e−007 |
| S14 | −9.33196 | 5.287963e−004 | −1.292466e−005 | 1.078911e−005 | 0.000000e+000 |
| S18 | −2.26545 | 4.565649e−005 | 0.000000e+000 | 0.000000e+000 | 0.000000e+000 |
| S19 | −10.89150 | −3.893052e−004 | −4.814758e−007 | 0.000000e+000 | 0.000000e+000 |

<Second Sub Lens System 111b>

| Lens Surface | RC | Thickness | Nd | Abbe Number |
|---|---|---|---|---|
| S13(ST) | 4.782 | 1.63 | 1.496997 | 81.6084 |
| S14 | −9.115 | 0.10 | | |
| S15 | 5.162 | 1.62 | 1.656549 | 58.0326 |
| S16 | −5.100 | 1.57 | 1.874142 | 41.3495 |

(*RC: Radius of Curvature/Nd: Refractive Index)

Aspheric coefficients of the second sub lens system 111b of the lens system 111 according to the current embodiment are shown below.

| Lens Surface | K | A | B | C | D |
|---|---|---|---|---|---|
| S13 | −0.75687 | 4.964696e−004 | −3.267803e−005 | 7.128976e−006 | 4.370830e−007 |
| S14 | −4.20724 | 1.460385e−004 | −6.315315e−005 | 1.215563e−005 | 0.000000e+000 |

The first sub lens system 111a and the second sub lens system 111b share surfaces S1 through S12 and surfaces S17 through IMAGE.

| | Wide Angle Position | Middle Position | Telephoto Position | Single Focus Position |
|---|---|---|---|---|
| EFL | 4.380 | 13.140 | 41.172 | 49.406 |
| FOV | 41.682 | 16.531 | 5.411 | 4.513 |
| F/# | 3.259 | 4.879 | 5.938 | 6.138 |
| D0 | INFINITY | INFINITY | INFINITY | INFINITY |
| D1 | 0.594 | 8.552 | 18.765 | 19.116 |
| D2 | 13.705 | 5.685 | 1.050 | 1.000 |
| D3 | 4.268 | 10.526 | 14.662 | 12.878 |
| D4 | 3.178 | 3.000 | 2.100 | 2.100 |

FIGS. 5A, 5B, 5C, and 5D show aberrations of the lens system 111 according to another embodiment of FIG. 4 at the wide angle position, the middle position, the telephoto position, and the single focus position, respectively.

[Third Embodiment]

FIG. 6 is a diagram showing the lens system 111 according to another embodiment at a wide angle position, a middle position, a telephoto position, and a single focus position. The illustrated wide angle position, middle position, and telephoto position correspond to the first sub lens system 111a, while the illustrated single focus position corresponds to the second sub lens system 111b.

<First Sub Lens System 111a>

| Lens Surface | RC | Thickness | Nd | Abbe Number |
|---|---|---|---|---|
| OBJECT | INFINITY | D0 | | |
| S1 | 23.874 | 0.90 | 1.922860 | 20.8804 |
| S2 | 17.548 | 2.84 | 1.496997 | 81.6084 |
| S3 | 55.600 | 0.10 | | |
| S4 | 25.753 | 2.08 | 1.823971 | 44.9902 |
| S5 | 91.000 | D1 | | |
| S6 | −277.233 | 0.60 | 1.884126 | 40.5408 |
| S7 | 6.255 | 2.40 | | |
| S8 | −40.582 | 0.50 | 1.792856 | 47.8723 |

-continued

| Lens Surface | RC | Thickness | Nd | Abbe Number |
|---|---|---|---|---|
| S9 | 9.858 | 0.26 | | |
| S10 | 9.320 | 1.72 | 1.922860 | 20.8804 |
| S11 | 99.000 | D2 | | |
| S12 | INFINITY | 0.30 | | |
| S13(ST) | 4.617 | 1.61 | 1.582273 | 51.5338 |
| S14 | −14.455 | 0.12 | | |
| S15 | 5.622 | 1.33 | 1.660467 | 58.0682 |
| S16 | −100.000 | 0.47 | 1.852471 | 27.4978 |
| S17 | 3.234 | D3 | | |
| S18 | 30.373 | 1.76 | 1.693500 | 53.2008 |
| S19 | −14.000 | D4 | | |
| S20 | INFINITY | 0.30 | 1.516798 | 64.1983 |
| S21 | INFINITY | 0.30 | | |
| S22 | INFINITY | 0.50 | 1.516798 | 64.1983 |
| S23 | INFINITY | 0.40 | | |
| IMAGE | INFINITY | | | |

(*RC: Radius of Curvature/Nd: Refractive Index)

Aspheric coefficients of the first sub lens system 111a of the lens system 111 according to the current embodiment are shown below.

| Lens Surface | K | A | B | C | D |
|---|---|---|---|---|---|
| S4 | −0.65396 | −5.364244e−006 | 1.019051e−008 | 0.000000e+000 | 0.000000e+000 |
| S5 | −50.00000 | −3.995928e−006 | 1.324739e−008 | 0.000000e+000 | 0.000000e+000 |
| S8 | −17.47272 | −5.380284e−004 | 6.459203e−005 | −1.826165e−006 | 2.207213e−008 |
| S9 | −9.67537 | 6.443796e−004 | 3.352423e−005 | −8.687407e−007 | 0.000000e+000 |
| S13 | −0.82493 | 3.811616e−004 | −6.217054e−006 | 1.928185e−005 | −3.307176e−007 |
| S14 | −9.84891 | 7.199459e−004 | 5.683928e−006 | 1.919705e−005 | 0.000000e+000 |
| S18 | −35.221432 | 0.000000e+000 | 0.000000e+000 | 0.000000e+000 | 0.000000e+000 |
| S19 | 0.978960 | 0.000000e+000 | 0.000000e+000 | 0.000000e+000 | 0.000000e+000 |

<Second Sub Lens System 111b>

| Lens Surface | RC | Thickness | Nd | Abbe Number |
|---|---|---|---|---|
| S13(ST) | 4.033 | 1.70 | 1.496997 | 81.6084 |
| S14 | −10.225 | 0.10 | | |
| S15 | 3.904 | 1.72 | 1.541958 | 71.8461 |
| S16 | −4.465 | 0.60 | 1.845722 | 43.2825 |

(*RC: Radius of Curvature/Nd: Refractive Index)

Aspheric coefficients of the second sub lens system 111b of the lens system 111 according to the current embodiment are shown below.

| Lens Surface | K | A | B | C | D |
|---|---|---|---|---|---|
| S13 | −0.55028 | 6.602368e−004 | 2.093539e−005 | 5.271381e−006 | 5.626225e−007 |
| S14 | −19.29024 | −1.195566e−003 | 9.648517e−005 | 3.048732e−006 | 0.000000e+000 |

The first sub lens system 111a and the second sub lens system 111b share surfaces S1 through S12 and surfaces S17 through IMAGE.

| | Wide Angle Position | Middle Position | Telephoto Position | Single Focus Position |
|---|---|---|---|---|
| EFL | 4.450 | 13.350 | 41.830 | 50.196 |
| FOV | 41.231 | 16.285 | 5.327 | 4.443 |
| F/# | 3.156 | 4.824 | 5.710 | 5.915 |
| D0 | INFINITY | INFINITY | INFINITY | INFINITY |
| D1 | 0.804 | 8.548 | 18.569 | 18.949 |
| D2 | 13.178 | 5.753 | 1.000 | 1.000 |
| D3 | 4.121 | 11.039 | 14.448 | 13.861 |
| D4 | 3.122 | 3.000 | 2.128 | 2.100 |

FIGS. 7A, 7B, 7C, and 7D show aberrations of the lens system 111 according to another embodiment of FIG. 6 at the wide angle position, the middle position, the telephoto position, and the single focus position, respectively.

[Fourth Embodiment]

FIG. 8 is a diagram showing a lens system 111 according to another embodiment at a wide angle position, a middle position, a telephoto position, and a single focus position. The illustrated wide angle position, middle position, and telephoto position correspond to the first sub lens system 111a, while the illustrated single focus position corresponds to the second sub lens system 111b.

<First Sub Lens System 111a>

| Lens Surface | RC | Thickness | Nd | Abbe Number |
|---|---|---|---|---|
| OBJECT | INFINITY | D0 | | |
| S1 | INFINITY | 0.95 | | |
| S2 | 27.459 | 0.90 | 1.993389 | 21.7442 |
| S3 | 19.154 | 2.74 | 1.504143 | 79.7567 |
| S4 | 75.679 | 0.10 | | |
| S5 | 23.899 | 2.06 | 1.826710 | 44.7627 |
| S6 | 91.000 | D1 | | |
| S7 | 52.135 | 0.60 | 1.911990 | 35.0574 |
| S8 | 5.762 | 2.86 | | |

-continued

| Lens Surface | RC | Thickness | Nd | Abbe Number |
|---|---|---|---|---|
| S9 | −97.000 | 0.90 | 1.811141 | 46.1090 |
| S10 | 7.787 | 0.13 | | |
| S11 | 9.329 | 1.69 | 1.20026 | 19.320 |
| S12 | 78.370 | D2 | | |
| S13 | INFINITY | 0.30 | | |
| S14(ST) | 4.733 | 1.95 | 1.582763 | 62.3642 |
| S15 | −15.557 | 0.14 | | |
| S16 | 5.491 | 1.18 | 1.509683 | 78.4118 |
| S17 | 10.345 | 0.49 | 1.788126 | 24.5208 |
| S18 | 3.334 | D3 | | |
| S19 | 21.100 | 1.75 | 1.497563 | 81.4566 |
| S20 | −17.000 | D4 | | |
| S21 | INFINITY | 0.30 | 1.516798 | 64.1983 |
| S22 | INFINITY | 0.30 | | |
| S23 | INFINITY | 0.50 | 1.516798 | 64.1983 |
| S24 | INFINITY | 0.40 | | |
| IMAGE | INFINITY | | | |

(*RC: Radius of Curvature/Nd: Refractive Index)

Aspheric coefficients of the first sub lens system 111a of the lens system 111 according to the current embodiment are shown below.

| Lens Surface | K | A | B | C | D |
|---|---|---|---|---|---|
| S9 | −30.76950 | −2.291500e−003 | 1.046488e−004 | −1.699025e−006 | 0.000000e+000 |
| S10 | 1.00000 | −2.782020e−003 | 1.301520e−004 | −2.881407e−006 | 0.000000e+000 |
| S14 | −0.96893 | 7.212680e−004 | 2.225291e−005 | 1.489693e−005 | −1.599167e−007 |
| S15 | 0.94081 | 1.534263e−003 | 3.648990e−005 | 1.376594e−005 | 6.558430e−007 |
| S19 | −39.93351 | 6.840088e−004 | −8.513116e−006 | 0.000000e+000 | 0.000000e+000 |
| S20 | −3.55035 | 6.823133e−005 | −8.915550e−006 | 0.000000e+000 | 0.000000e+000 |

<Second Sub Lens System 111b>

| Lens Surface | RC | Thickness | Nd | Abbe Number |
|---|---|---|---|---|
| S14(ST) | 4.684 | 1.65 | 1.578729 | 66.2775 |
| S15 | −15.511 | 0.27 | | |
| S16 | 5.608 | 1.25 | 1.496997 | 81.6084 |
| S17 | 11.106 | 0.59 | 1.807494 | 26.7477 |

(*RC: Radius of Curvature/Nd: Refractive Index)

Aspheric coefficients of the second sub lens system 111b of the lens system 111 according to the current embodiment are shown below.

| Lens Surface | K | A | B | C | D |
|---|---|---|---|---|---|
| S14 | −0.98122 | 9.319258e−004 | −1.995461e−004 | 6.037849e−005 | −3.093815e−006 |
| S15 | −49.24624 | −3.157479e−005 | −1.341465e−004 | 7.850190e−005 | −5.261582e−006 |

The first sub lens system 111a and the second sub lens system 111b share surfaces S1 through S13 and surfaces S18 through IMAGE.

| | Wide Angle Position | Middle Position | Telephoto Position | Single Focus Position |
|---|---|---|---|---|
| EFL | 4.450 | 13.350 | 41.830 | 50.196 |
| FOV | 41.231 | 16.285 | 5.327 | 4.443 |
| F/# | 3.270 | 4.910 | 5.921 | 5.825 |
| D0 | INFINITY | INFINITY | INFINITY | INFINITY |
| D1 | 0.446 | 8.315 | 17.770 | 19.514 |
| D2 | 12.472 | 5.393 | 0.900 | 0.900 |
| D3 | 3.862 | 10.355 | 14.371 | 13.199 |
| D4 | 3.257 | 3.000 | 2.100 | 2.100 |

FIGS. 9A, 9B, 9C, and 9D show aberrations of the lens system 111 according to another embodiment of FIG. 8 at the wide angle position, the middle position, the telephoto position, and the single focus position, respectively.

The table below shows that the lens systems according to the first through fourth embodiments satisfy Expressions 1 through 3.

| | First Embodiment | Second Embodiment | Third Embodiment | Fourth Embodiment |
|---|---|---|---|---|
| Expression 1 | 9.4 | 9.4 | 9.4 | 9.4 |
| Expression 2 | 1.074468 | 1.19999 | 1.2 | 1.2 |
| Expression 3 | 1.065503 | 1.013472 | 1.00602 | 1.001732 |

As described above, a lens system according to an embodiment embodies different types of focal lengths with a single lens system, and thus the size of the lens system according to the embodiments may be reduced while having various types of focal lengths.

Figure 10:
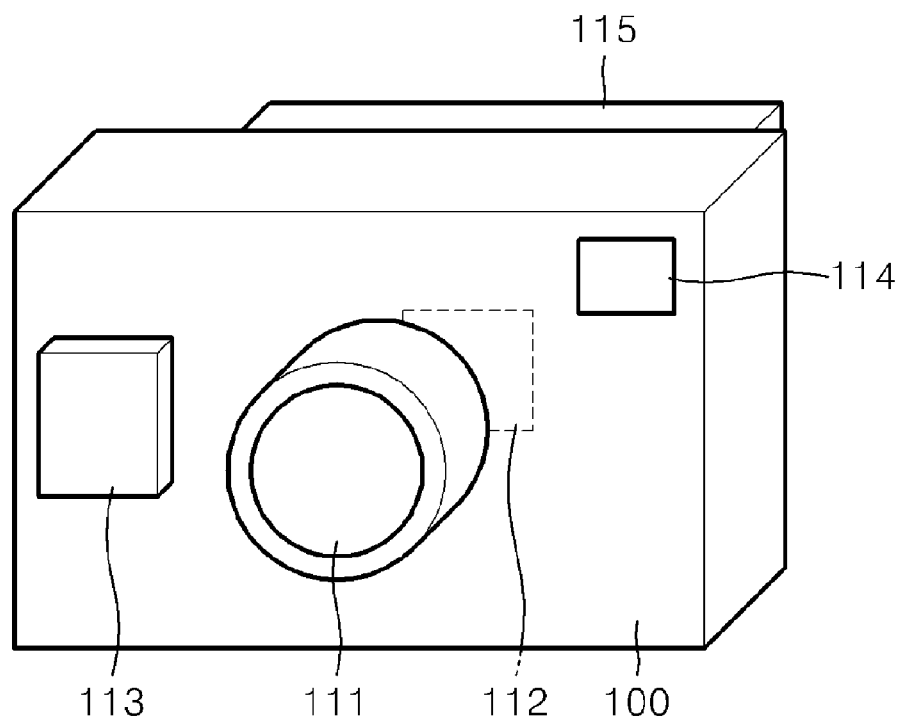
FIG. 10 is a diagram of an image capturing device having a lens system according to an embodiment.

FIG. 10 is a diagram of an image capturing device 100 having a lens system 111 according to an embodiment. The image capturing device 100 includes the lens system 111 as described above and an imaging sensor 112 that converts an image formed by the lens system 111 into electric image signals. The image capturing device 100 may include a recording medium 113 in which data corresponding to an image of a subject photoelectrically converted by the imaging sensor 112 are recorded, and a viewfinder 114 for watching an image of the subject. Furthermore, the image capturing device 100 may include a display unit 115 on which an image of the subject is displayed. Although an example in which the viewfinder 114 and the display unit 115 are separate from each other is shown here, the image capturing device 100 may include only the display unit 115, without including the viewfinder 114. The image capturing device 100 shown in FIG. 10 is merely an example, should not be construed as limiting. A lens system according to various embodiments may be applied to various types of optical devices other than a camera. Accordingly, various image capturing devices (e.g., digital cameras) may include a small and inexpensive optical device that captures wide-angle images using a zoom lens system according to various embodiments.

An image capturing device according to an embodiment may inexpensively satisfy various demands of a user by embodying various focal lengths by exchanging a part of lens groups instead of replacing the entire lens system. Furthermore, since it is not necessary to carry two separate lens systems having different focal lengths, a user may conveniently use an image capturing device according to the embodiment.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No item or component is essential to the practice of the invention unless the element is specifically described as "essential" or "critical".

While a lens system according to the invention and an image capturing device including the lens system have been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. A lens system comprising:
a first lens group having a positive refractive power;
a second lens group having a negative refractive power;
a third lens group having a positive refractive power;
a fourth lens group having a positive refractive power; and
a fifth lens group that is exchangeable with the third lens group,
wherein the first lens group, the second lens group, the third lens group, and the fourth lens group are sequentially arranged along an optical axis to form a first sub lens system, and
the first lens group, the second lens group, the fifth lens group, and the fourth lens group are alternatively sequentially arranged along the optical axis to form a second sub lens system.

2. The lens system of claim 1, wherein the first sub lens group has a zoom magnification satisfying an Expression:

$$5.0 \leq ft/fw \leq 15.0,$$

where ft indicates a focal length of the first sub lens system at a telephoto position, and fw indicates a focal length of the first sub lens system at a wide angle position.

3. The lens system of claim 2, wherein the second sub lens system has a single focal length.

4. The lens system of claim 3, wherein the fifth lens group has a positive refractive power.

5. The lens system of claim 3, satisfying an Expression:

$$1.1 \leq ff/ft \leq 1.5,$$

where ft indicates a total focal length of the first sub lens system at the telephoto position, and ff indicates a total focal length of the second sub lens system.

6. The lens system of claim 3, satisfying an Expression:

$$0.8 < (Lt3/ft) + (Lf3/ff) < 1.2,$$

where Lt3 indicates a distance from a first surface of a lens of the third lens group closest to an object side in the first sub lens system to an imaging plane, and Lf3 indicates a distance from a first surface of a lens of the fifth lens group closest to the object side in the second sub lens system to the imaging plane.

7. The lens system of claim 3, satisfying an Expression:

$$Lf1 \leq Lt1,$$

where Lt1 indicates a distance from a first surface of a lens of the first lens group closest to an object side in the first sub lens system to an imaging plane, and Lf1 indicates a distance from a first surface of a lens of the first lens group closest to the object side in the second sub lens system to the imaging plane.

8. The lens system of claim 3, satisfying an Expression:

$$5.0 \leq ff/ff3 \leq 6.5,$$

where ff3 indicates a focal length of the fifth lens group in the second sub lens system, and ff indicates a total focal length of the second sub lens system.

9. The lens system of claim 3, wherein the fifth lens group comprises an aspheric lens having a positive refractive power and a doublet lens having a negative refractive power, and
the aspheric lens and the doublet lens are sequentially arranged from an object side to an imaging plane.

10. The lens system of claim 3, wherein a lens of the first lens group closest to an object side has a positive refractive power and satisfies an Expression:

$$1.9 \leq Nd1,$$

where Nd1 indicates a refractive index of the lens of the first lens group closest to the object side.

11. The lens system of claim 3, wherein a lens of the second lens group closest to an imaging plane has a positive refractive power and satisfies an Expression:

$$1.88 \leq Nd1.$$

where Nd1 indicates a refractive index of the lens of the second lens group closest to the imaging plane.

12. The lens system of claim 3, wherein the first lens group comprises at least one lens satisfying an Expression:

$$80 \leq Vd1,$$

where Vd1 indicates an Abbe number of at least one lens in the first lens group.

13. The lens system of claim 3, wherein the second lens group comprises at least one lens satisfying an Expression:

$$30 \leq Vd2 \leq 50,$$

where Vd2 indicates an Abbe number of at least one lens in the second lens group.

14. The lens system of claim 3, wherein, when the first sub lens system is zoomed from the wide angle position to the telephoto position, an interval between the first lens group and the second lens group increases and an interval between the second lens group and the third lens group decreases.

15. The lens system of claim 1, wherein, when the first sub lens system is zoomed from a wide angle position to a telephoto position, the fourth lens group performs focusing.

16. The lens system of claim 1, wherein the third lens group performs image blur correction.

17. The lens system of claim 1, wherein at least one of the first, second, third, and fourth lens groups comprises a hybrid lens.

18. A lens system comprising:
a zoom lens system that zooms from a wide angle position to a telephoto position, the zoom lens system comprising a plurality of lens groups; and
an exchanging lens group that exchanges with at least one of the plurality of lens groups,
wherein the plurality of lens groups of the zoom lens system comprises:
a first lens group having a positive refractive power;
a second lens group having a negative refractive power;
a third lens group having a positive refractive power; and
a fourth lens group having a positive refractive power,
wherein the first, second, third, and fourth lens groups are sequentially arranged from an object side to an image side.

19. The lens system of claim 18, wherein the exchanging lens group exchanges with the third lens group.

20. A lens system comprising:
a zoom lens system that zooms from a wide angle position to a telephoto position, the zoom lens system comprising a plurality of lens groups; and
an exchanging lens group that exchanges with at least one of the plurality of lens groups,
wherein, when the exchanging lens group exchanges with at least one of the plurality of lens groups, the lens system has a single focal length, and
wherein the single focal length is longer than a total focal length of the zoom lens system at the telephoto position.

21. An image capturing device comprising:
a lens system comprising:
  a first lens group having a positive refractive power,
  a second lens group having a negative refractive power,
  a third lens group having a positive refractive power,
  a fourth lens group having a positive refractive power, and
  a fifth lens group that is exchangeable with the third lens group; and
an imaging sensor that photoelectrically converts an image formed by the lens system,
wherein the first lens group, the second lens group, the third lens group, and the fourth lens group are sequentially arranged along an optical axis to form a first sub lens system, and
the first lens group, the second lens group, the fifth lens group, and the fourth lens group are alternatively sequentially arranged along the optical axis to form a second sub lens system.

22. The image capturing device of claim 21, wherein the first sub lens group has a zoom magnification satisfying an Expression:

$$5.0 \leq ft/fw \leq 15.0,$$

where ft indicates a total focal length of the first sub lens system at a telephoto position, and ff indicates a total focal length of the second sub lens system.

23. The image capturing device of claim 22, wherein the second sub lens system has a single focal length.

* * * * *